United States Patent
Muruganathan et al.

(10) Patent No.: US 11,553,436 B2
(45) Date of Patent: Jan. 10, 2023

(54) AIRBORNE STATUS DEPENDENT UPLINK POWER CONTROL RELATED TASK(S) FOR AERIAL UES

(71) Applicant: Telefonaktiebolaget LM Ericsson (publ), Stockholm (SE)

(72) Inventors: Siva Muruganathan, Stittsville (CA); Shiwei Gao, Nepean (CA); Xingqin Lin, Santa Clara, CA (US); Helka-Liina Määttänen, Helsinki (FI); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 17/045,340

(22) PCT Filed: Apr. 5, 2019

(86) PCT No.: PCT/IB2019/052814
§ 371 (c)(1),
(2) Date: Oct. 5, 2020

(87) PCT Pub. No.: WO2019/193560
PCT Pub. Date: Oct. 10, 2019

(65) Prior Publication Data
US 2021/0168725 A1  Jun. 3, 2021

Related U.S. Application Data

(60) Provisional application No. 62/653,871, filed on Apr. 6, 2018, provisional application No. 62/653,493, filed on Apr. 5, 2018.

(51) Int. Cl.
*H04W 4/80* (2018.01)
*H04W 52/14* (2009.01)
(Continued)

(52) U.S. Cl.
CPC ........ *H04W 52/146* (2013.01); *H04W 24/10* (2013.01); *H04W 52/242* (2013.01);
(Continued)

(58) Field of Classification Search
CPC ........ H04W 4/33; H04W 4/80; H04B 17/345; G01C 5/00
See application file for complete search history.

(56) References Cited

U.S. PATENT DOCUMENTS

| | | |
|---|---|---|
| 10,517,062 B2* | 12/2019 | Chae .................... G01S 5/0036 |
| 2016/0323836 A1 | 11/2016 | Park |
| 2018/0233055 A1* | 8/2018 | Damnjanovic ...... G08G 5/0069 |

FOREIGN PATENT DOCUMENTS

| | | |
|---|---|---|
| CN | 105359594 A | 2/2016 |
| KR | 101055819 B1 | 8/2011 |

(Continued)

OTHER PUBLICATIONS

Author Unknown, "Technical Specification Group Radio Access Network; Evolved Universal Terrestrial Radio Access (E-UTRA); Physical layer procedures (Release 15)," Technical Specification 36.213, Version 15.1.0, 3GPP Organizational Partners, Mar. 2018, 495 pages.

(Continued)

*Primary Examiner* — Tu X Nguyen
(74) *Attorney, Agent, or Firm* — Withrow & Terranova, PLLC

(57) ABSTRACT

Systems and methods are disclosed herein for uplink power control in a cellular communications network that are particularly well-suited for flying wireless devices (e.g., aerial User Equipments (UEs)). In some embodiments, a method performed by a wireless device for uplink power control comprises receiving, from a base station, reference altitude information comprising one or more height thresholds and (Continued)

The LTE downlink physical resource detecting that a height of the wireless device is above a height threshold. The method further comprises triggering and sending a measurement report to the base station upon detecting that the height of the wireless device is above the height threshold, and receiving, from the base station, an indication to use a particular one of two or more fractional pathloss compensation factors for uplink power control. The two or more fractional pathloss compensation factors for uplink power control comprise one or more wireless device specific fractional pathloss compensation factors.

14 Claims, 13 Drawing Sheets

(51) Int. Cl.
　　*H04W 24/10*　　(2009.01)
　　*H04W 52/24*　　(2009.01)
　　*H04W 52/28*　　(2009.01)
　　*H04W 72/04*　　(2009.01)
　　*H04W 80/02*　　(2009.01)
　　*H04W 84/06*　　(2009.01)
(52) U.S. Cl.
　　CPC ....... *H04W 52/283* (2013.01); *H04W 52/285* (2013.01); *H04W 72/042* (2013.01); *H04W 80/02* (2013.01); *H04W 84/06* (2013.01)

(56) References Cited

FOREIGN PATENT DOCUMENTS

| | | |
|---|---|---|
| WO | 2015005463 A1 | 1/2015 |
| WO | 2018203402 A1 | 11/2018 |

OTHER PUBLICATIONS

Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.1.0, 3GPP Organizational Partners, Mar. 2018, 109 pages.
Author Unknown, "Technical Specification Group Radio Access Network; Study on Enhanced LTE Support for Aerial Vehicles (Release 15)," Technical Specification 36.777, Version 15.0.0, 3GPP Organizational Partners, Dec. 2017, 89 pages.
Author Unknown, "Technical Specification Group Radio Access Network; NR; Radio Resource Control (RRC) protocol specification (Release 15)," Technical Specification 38.331, Version 15.1.0, 3GPP Organizational Partners, Mar. 2018, 268 pages.
Ericsson, "RP-172826: New WID on Enhanced LTE Support for Aerial Vehicles," Third Generation Partnership Project (3GPP), TSG RAN Meeting #78, Dec. 18-21, 2017, 4 pages, Lisbon, Portugal.
Ericsson, "RP-180300: Enhanced LTE Support for Aerial Vehicles," Third Generation Partnership Project (3GPP), TSG-RAN Meeting #79, Mar. 19-22, 2018, 5 pages, Chennai, India.
Nokia et al., "R2-1803349: Mobility enhancements for UAVs—reference altitude," Third Generation Partnership Project (3GPP), TSG-RAN WG2 Meeting #101, Feb. 26-Mar. 2, 2018, 3 pages, Athens, Greece.
International Search Report and Written Opinion for International Patent Application No. PCT/IB2019/052814, dated Jul. 10, 2019, 18 pages.
Written Opinion for International Patent Application No. PCT/IB2019/052814, dated Mar. 12, 2020, 6 pages.
International Preliminary Report on Patentability for International Patent Application No. PCT/IB2019/052814, dated Jun. 22, 2020, 24 pages.
Author Unknown, "Technical Specification Group Radio Access Network; Study on Enhanced LTE Support for Aerial Vehicles (Release 15)," Technical Report 36.777, Version 1.0.0, 3GPP Organizational Partners, Dec. 2017, 93 pages.
Notice of Preliminary Rejection for Korean Patent Application No. 2020-7030998, dated May 28, 2021, 15 pages.
Ericsson, "Tdoc R2-1802788: Airborne status indication and related mobility enhancements," 3GPP TSG-RAN NG2 #101, Feb. 2018, Athens, Greece, 4 pages.
NTT DOCOMO, "R1-1720784: Views on Issues and solutions in uplink," 3GPP TSG RAN WG1 Meeting 91, Nov. 27-Dec. 1, 2017, Reno, Nevada, 10 pages.
Office Action for Japanese Patent Application No. 2020-548797, dated Nov. 19, 2021, 90 pages.
Decision of Refusal for Japanese Patent Application No. 2020-548797, dated Jun. 24, 2022, 7 pages.

* cited by examiner

The LTE downlink physical resource

LTE time domain structure

*Downlink subframe*

*Uplink L1/L2 control signaling transmission on PUCCH*

PUSCH resource assignment

UL interference from UE3 (which is attached to a drone) to UE1 and UE2 in neighbor cells

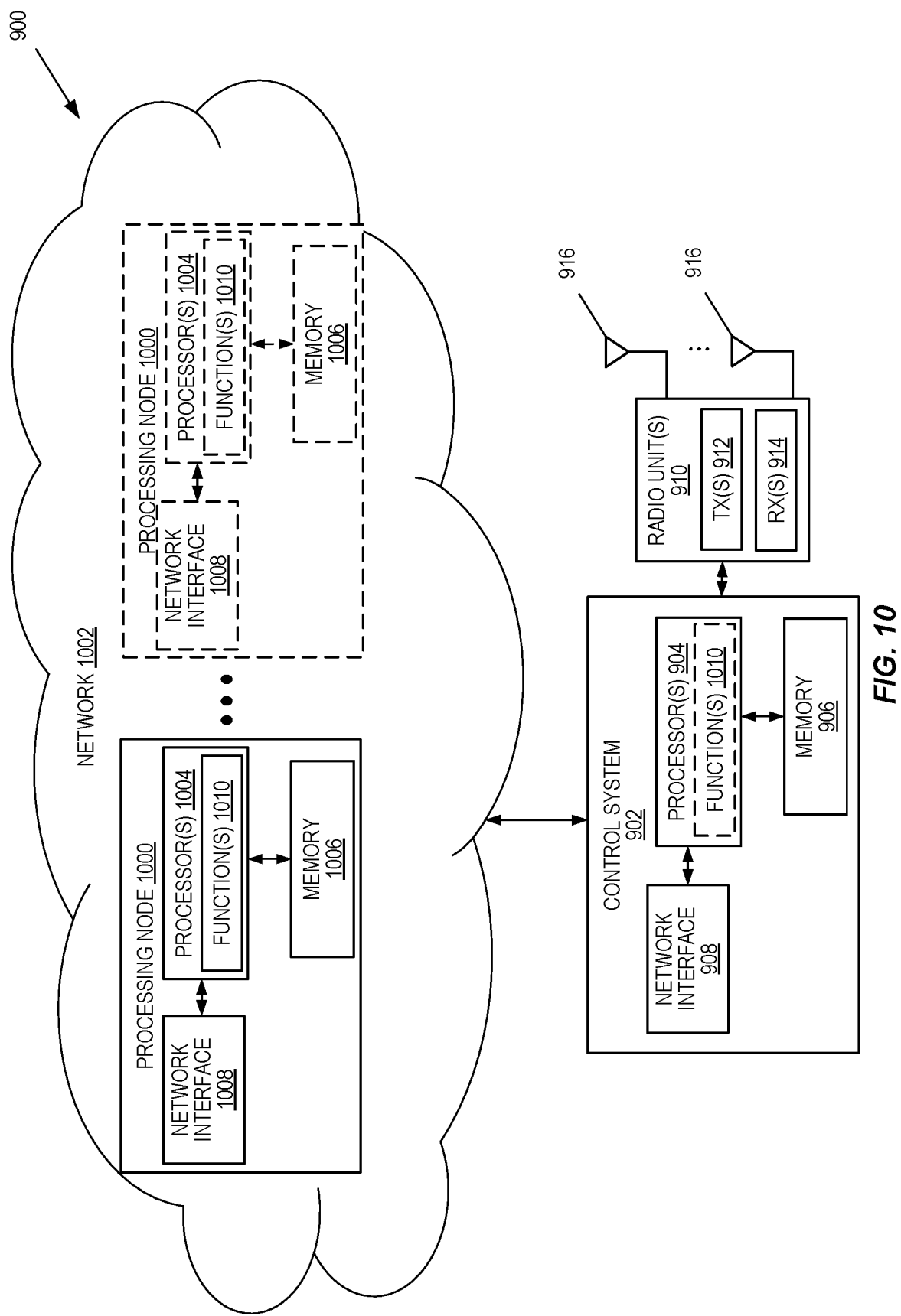

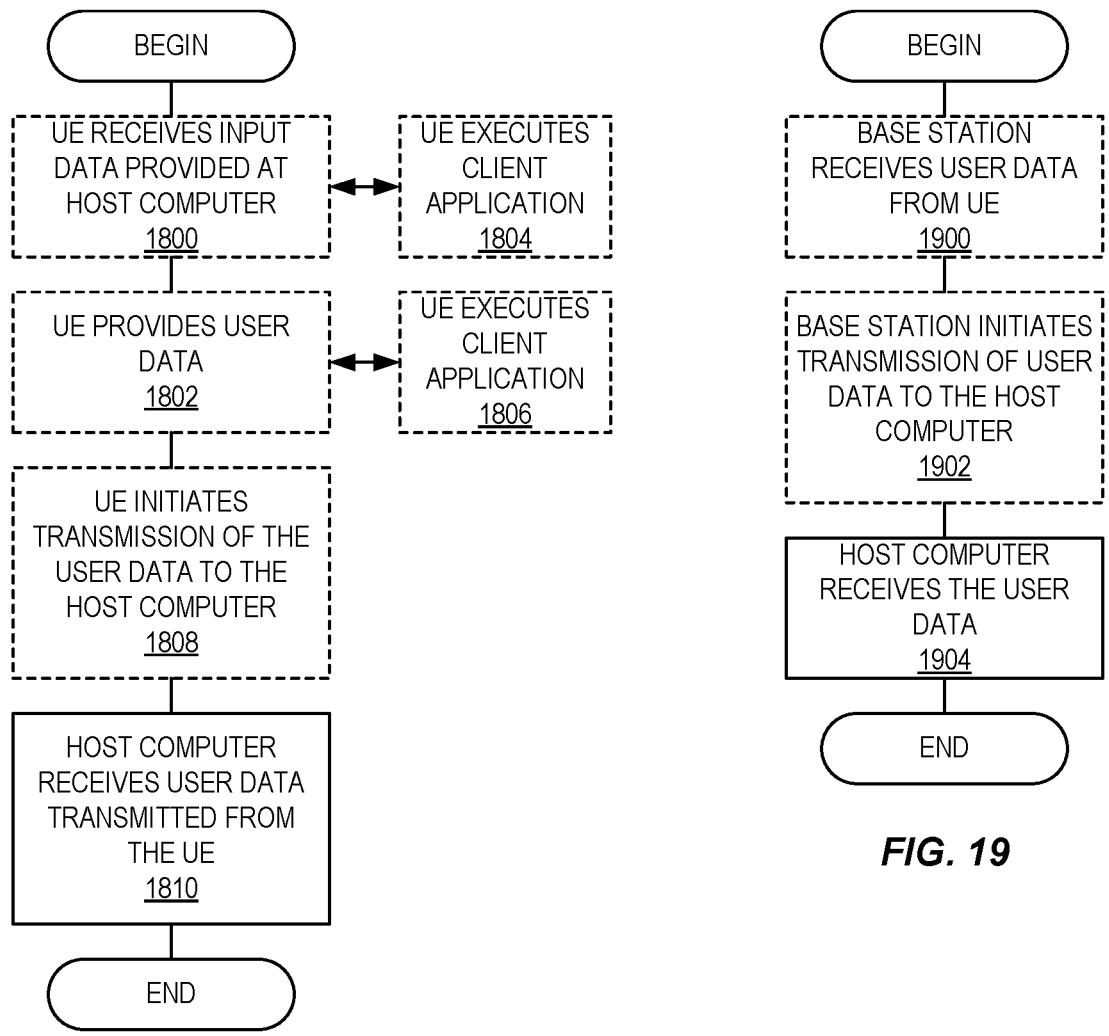

AIRBORNE STATUS DEPENDENT UPLINK POWER CONTROL RELATED TASK(S) FOR AERIAL UES

RELATED APPLICATIONS

This application is a 35 U.S.C. § 371 national phase filing of International Application No. PCT/IB2019/052814, filed Apr. 5, 2019, which claims the benefit of provisional patent application Ser. No. 62/653,493, filed Apr. 5, 2018 and provisional patent application Ser. No. 62/653,871, filed Apr. 6, 2018, the disclosures of which are hereby incorporated herein by reference in their entireties.

TECHNICAL FIELD

The present disclosure relates to aerial User Equipments (UEs) in a cellular communications network and, more specifically, to performance of uplink power control related tasks for aerial UEs.

BACKGROUND

Long Term Evolution (LTE) Downlink and Uplink

LTE uses Orthogonal Frequency Division Multiplexing (OFDM) in the downlink and Discrete Fourier Transform (DFT) spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 milliseconds (ms), each radio frame consisting of ten equally-sized subframes of length $T_{subframe}=1$ ms, as shown in FIG. 2.

Furthermore, the resource allocation in LTE is typically described in terms of Resource Blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the enhanced or evolved Node B (eNB) transmits control information about to which User Equipment devices (UEs) data is transmitted and upon which resource blocks the data is transmitted, in the current downlink subframe. This control signaling is typically transmitted in the first 1, 2, 3, or 4 OFDM symbols in each subframe. A downlink system with 3 OFDM symbols as control is illustrated in FIG. 3.

In LTE, a number of physical channels are supported. The following are some of the physical channels supported in LTE:
  Physical Downlink Shared Channel (PDSCH)
  Physical Downlink Control Channel (PDCCH)
  Enhanced PDCCH (EPDCCH)
  Physical Uplink Shared Channel (PUSCH)
  Physical Uplink Control Channel (PUCCH)

PDSCH is used mainly for carrying user traffic data and higher layer messages. PDSCH is transmitted in a downlink subframe outside of the control region shown in FIG. 3. Both PDCCH and EPDCCH are used to carry Downlink Control Information (DCI). PDCCH is transmitted in the control region in a downlink subframe, while EPDCCH is transmitted in the same region as PDSCH. PUSCH is used for carrying user data and/or Uplink Control Information (UCI) in the uplink while PUCCH is used for carrying UCI only in the uplink.

LTE uses Hybrid Automatic Repeat Request (HARQ) where, after receiving downlink data in a subframe, the UE attempts to decode it and reports to the eNB whether the decoding was successful (Acknowledgement (ACK)) or not (Negative Acknowledgement (NACK)). In case of an unsuccessful decoding attempt, the eNB can retransmit the erroneous data.

Uplink control signaling from the UE to the eNB consists of:
  HARQ acknowledgements for received downlink data;
  UE reports related to the downlink channel conditions, used as assistance for the downlink scheduling;
  scheduling requests indicating that a UE needs uplink resources for uplink data transmissions.

If the UE has not been assigned an uplink resource for data transmission, the L1/L2 control information (channel status information reports, HARQ acknowledgments, and scheduling requests) is transmitted in uplink resources (resource blocks) specifically assigned for uplink L1/L2 control on PUCCH. As illustrated in FIG. 4, these resources are located at the edges of the total available cell bandwidth. Each such resource consists of twelve "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resource blocks can be assigned next to the previously assigned resource blocks.

To transmit data in the uplink the terminal has to been assigned an uplink resource for data transmission on the PUSCH. FIG. 5 shows an example of PUSCH resource assignment to two users (denoted as User 1 and User 2 in the figure). The middle symbol in each slot is used to transmit a reference symbol. If the UE has been assigned an uplink resource for data transmission and at the same time instance has control information to transmit, it will transmit the control information together with the data on PUSCH.

PDCCH and EPDCCH in LTE

PDCCH and EPDCCH are used to carry DCI such as scheduling decisions and power-control commands. More specifically, the DCI may include:
  Downlink scheduling assignments, including PDSCH resource indication, transport format, HARQ information, and control information related to spatial multiplexing (if applicable). A downlink scheduling assignment also includes a command for power control of the PUCCH used for transmission of HARQ ACKs in response to downlink scheduling assignments.
  Uplink scheduling grants, including PUSCH resource indication, transport format, and HARQ-related information. An uplink scheduling grant also includes a command for power control of the PUSCH.
  Power-control commands for a set of terminals as a complement to the commands included in the scheduling assignments/grants.

One PDCCH/EPDCCH carries one DCI message with one of the formats above. As multiple terminals can be scheduled simultaneously on both downlink and uplink, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each cell. Furthermore, to support different radio channel conditions, link adaptation can be used, where the code rate of the PDCCH/EPDCCH is selected by adapting the resource usage for the PDCCH/EPDCCH to match the radio channel conditions.

Different DCI formats are defined in LTE for downlink and uplink. For example, DCI formats 0 and 4 are used for uplink data scheduling while DCI formats 1, 1A, 1B, 1C, 1D, 2, 2A, 2B, 2C, and 2D are used for downlink data scheduling. Different DCI formats are designed for different transmission modes in either downlink or uplink. For example, DCI format 0 is for uplink data transmission with a single transmit antenna at a UE while DCI format 4 is for uplink data transmission with Multiple Input Multiple Output (MIMO) where a UE has more than one transmit antenna. In addition, DCI formats 3 and 3A are dedicated for uplink power control of PUCCH and PUSCH for a group of UEs. With the introduction of License Assisted Access (LAA), Machine Type Communication (MTC), and Narrowband Internet of Things (NB-IoT) in LTE, additional DCI formats have been added. For example, DCI formats 0A, 0B, 0C, 4A, 4B, 6-0A, and 6-0B are introduced for uplink data scheduling.

Each DCI typically contains multiple bit fields. The exact fields vary from one DCI format to another. Some common bit fields include:

Resource allocation

Modulation and Coding Scheme (MCS) and redundancy version

Transmit Power Control (TPC) command for PUSCH (in uplink related DCIs, e.g. DCI formats 0 and 4) or PUCCH (in downlink related DCIs, e.g. DCI formats 1 and 2)

One PDCCH/EPDCCH carries one DCI message with one of the formats above. As multiple terminals can be scheduled simultaneously on both downlink and uplink, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each cell.

Interference Caused by Aerial UEs in LTE Networks

UEs attached to drones or other aerial vehicles flying in the sky can cause uplink interference in neighbor cells due to high probability of Line Of Sight (LOS) condition to neighbor cells. When such UEs transmit signals to a serving eNB or network node on the ground, the signals will also reach neighbor eNBs with comparable levels of received signal power, which can cause interference to UEs being served by the neighbor cells. An example is shown in FIG. 6, where UE3 on a drone is served by eNB3 and can cause interference to eNB1 which is receiving an uplink signal from UE1 and also cause interference to eNB2 which is receiving an uplink signal from UE2 in neighbor cells. Note that even though the example in FIG. 6 shows UE3 on a drone, the interference issue described in the example is also present in case UE3 itself is a drone UE.

Such uplink interference needs to be controlled/mitigated in order to enable services to UEs attached to drones or drone UEs in existing cellular networks.

A number of solutions have been proposed in Third Generation Partnership Project (3GPP) studies on serving aerial vehicles by existing terrestrial LTE networks. Some of them are related to uplink power control which are described in 3GPP Technical Report (TR) 36.777 [1].

Uplink Power Control in LTE

In LTE, one of the power control methods for PUSCH on a serving carrier, c, is given by the formula below in Equation 1 [2]. Note that the formula in Equation 1 is applicable when the UE does not transmit other channels with PUSCH in subframe i'. Although the ideas presented in the present disclosure are described for the case when the UE does not transmit other channels with PUSCH in subframe i', the idea can be easily extended to cases when the UE transmits other channels (such as PUCCH) with PUSCH.

$$P_{PUSCH,c}(i) = \min\left\{\begin{array}{l} P_{CMAX,c}(i'), \\ 10\log_{10}(M_{PUSCH,c}(i')) + P_{O\_PUSCH,c}(j) + \\ \alpha_c(j) \cdot PL_c + \Delta_{TF,c}(i') + f_c(i') \end{array}\right\} \quad \text{Equation 1}$$

where j=0 corresponds to PUSCH transmissions or retransmissions scheduled using a semi-persistent grant; j=1 corresponds to PUSCH transmissions or retransmissions scheduled using a dynamic grant; and j=2 corresponds to PUSCH transmissions or retransmissions scheduled using a random access response grant. The other notations from Equation 1 are described below:

$P_{CMAX,c}$(i') is the configured UE transmit power in decibel-milliwatts (dBm) in subframe i' for serving cell c $M_{PUSCH,c}$(i') is the bandwidth of the PUSCH resource assignment expressed in number of resource blocks valid for subframe i' and serving cell c.

$P_{O\_PUSCH,c}$(j) is an open loop power control parameter in dBm composed of the sum of a cell specific component $P_{O\_NOMINAL\_PUSCH,c}$(j) and a UE specific component $P_{O\_UE\_PUSCH,c}$(j) for serving cell c. As discussed in Section 5.1.1.1 of TS 36.213 [2], for j=0 and j=1, components $P_{O\_NOMINAL\_PUSCH,c}$(j) and $P_{O\_UE\_PUSCH,c}$(j) are configured by higher layers. For j=2, $P_{O\_UE\_PUSCH,c}$(j)=0 and $P_{O\_NOMINAL\_PUSCH,c}$(j)=$P_{O\_PRE}$+$\Delta_{PREAMBLE\_Msg3}$ wherein $P_{O\_PRE}$ and $\Delta_{PREAMBLE\_Msg3}$ are additional parameters configured by higher layers.

$\alpha_c$(j) is a fractional path loss compensation power control parameter for serving cell c. For j=0 and j=1, $\alpha_c$(j)∈{0, 0.4, 0.5, 0.6, 0.7, 0.8, 0.9, 1} is a 3-bit parameter provided by higher layers. For j=2, $\alpha_c$(j)=1. Note that in LTE up to Release 14, $\alpha_c$(j) is configured in a cell specific way.

$PL_c$ is the downlink pathloss estimate calculated in the UE for serving cell c in decibels (dB) and $PL_c$=referenceSignalPower−higher layer filtered Reference Signal Received Power (RSRP), where referenceSignalPower is provided by higher layers and RSRP is the reference signal received power at the UE for the serving cell.

$\Delta_{TF,c}$(i') is offset which can be used to ensure that the received Signal to Noise Ratio (SINR) matches the SINR required for a given MCS (that is the PUSCH data rate) selected by the eNB. It is also possible to set $\Delta_{TF,c}$(i') to zero in which case the PUSCH received power will be matched to a certain MCS given by the value of $P_{O\_PUSCH,c}(j)$ selected by the eNB.

$f_c(i')=f_c(i'-1)+\delta_{PUSCH,c}(i'-K_{PUSCH})$ is the current PUSCH power control adjustment state for serving cell c if accumulation is enabled and $f_c(i')=\delta_{PUSCH,c}(i'-K_{PUSCH})$ if accumulation is not enabled. Note that $\delta_{PUSCH,c}(i'-K_{PUSCH})$ is a correction value, also referred to as a TPC command, signaled to the UE in the downlink control channel at subframe i'K$_{PUSCH}$. For Frequency Division Duplex (FDD) systems, K$_{PUSCH}$ equals 4. For Time Division Duplex (TDD) systems, the values of K$_{PUSCH}$ are given in Section 5.1.1.1 of Technical Specification (TS) 36.213 [2]. Note that if accumulation is enabled, the UE follows the procedures given below:

If $P_{CMAX,c}(i')$ has been reached by the UE for serving cell c, then positive TPC commands shall not be accumulated for serving cell c If UE has reached minimum power, then negative TPC commands shall not be accumulated for serving cell c The UE shall reset accumulation for serving cell c when the value of $P_{O\_UE\_PUSCH,c}(j)$ is changed by higher layers The UE shall reset accumulation for serving cell c when the UE receives random access response message for serving cell c The above power control consists two parts, i.e. an open loop part, $10 \log_{10}(M_{PUSCH,c}(i'))+P_{O\_PUSCH,c}(j)+\alpha_c(j)\cdot PL_c+\Delta_{TF,c}(i')$, and a closed loop part, $f_c(i')$. The open loop part is used by a UE to estimate the approximate transmit power based on the pathloss estimation $PL_c$, the allocated PUSCH bandwidth $M_{PUSCH,c}(i')$, the modulation and coding rate, $\Delta_{TF,c}(i')$, and the target receive power $P_{O\_PUSCH,c}(j)$. The closed loop power control is used to fine tune the UE transmit power based on the target received signal power $P_{O\_PUSCH,c}(j)$ and the actual received PUSCH power at the network node. The closed loop control is done by sending the UE a TPC command by the eNB and requesting the UE to adjust its transmit power. Note that $P_{O\_PUSCH,c}(j)$ is a target received power per RB at a nominal MCS. It is adjusted when more than one RB is scheduled and/or at a different MCS, i.e. by the amount of $M_{PUSCH,c}(i')+\Delta_{TF,c}(i')$.

Other uplink power control methods including PUCCH and Sounding Reference Signal (SRS) power control can be found in Section 5 in TS 36.213 [2], and Physical Random Access Channel (PRACH) power control can be found in Section 6.1 in TS 36.213 [3].

For a TDD serving cell c (with frame structure type 2 as discussed in Section 5.1.3.1 of TS 36.213 [2]) that are not configured for PUSCH/PUCCH transmission in subframe the UE transmit power for SRS in subframe/is given by the formula below in Equation 2 [2].

$$P_{SRS,c}=\min\{P_{CMAX,c}(i'),10 \log_{10}(M_{SRS,c})+P_{O\_SRS,c}(m)+\alpha_{SRS,c}\cdot PL_c+f_{SRS,c}(i')\}$$ Equation 2 where $P_{CMAX,c}(i')$ and $PL_c$ are as defined in Equation 1. The other notations from Equation 2 are described below:

$M_{SRS,c}$ is the bandwidth of the SRS transmission expressed in number of resource blocks in subframe i' for serving cell c.

$P_{O\_SRS,c}(m)$ is composed of the sum of a cell specific component $P_{O\_NOMINAL\_SRS,c}(m)$ and a UE specific component $P_{O\_UE\_SRS,c}(m)$ for serving cell c. Here, m=0 corresponds to periodically transmitted SRS, and m=1 corresponds to aperiodically transmitted SRS.

$\alpha_{SRS,c}$ is a fractional path loss compensation power control parameter for serving cell c which is configured by higher layers in a cell specific way.

$f_{SRS,c}(i')=f_{SRS,c}(i'-1)+\delta_{SRS,c}(i'-K_{SRS})$ is the current SRS power control adjustment state for serving cell c if accumulation is enabled and $f_{SRS,c}(i')=\delta_{SRS,c}(i'-K_{SRS})$ if accumulation is not enabled. Note that $\delta_{SRS,c}(i'-K_{SRS})$ is a correction value, also referred to as a SRS TPC command, signaled to the UE in the downlink control channel at the most recent subframe i'-K$_{SRS}$. Note that if accumulation is enabled, the UE follows the procedures given below:

The UE shall reset accumulation for serving cell c when the value of $P_{O\_UE\_SRS,c}(m)$ is changed by higher layers.

The UE shall reset accumulation for serving cell c when the UE receives random access message for serving cell c.

The power control for random access preamble transmission in PRACH is described in TS 36.213, Section 6.1. For a non-Bandwidth Limited (BL)/Coverage Enhancement (CE) UE or for a BL/CE UE with the PRACH coverage enhancement level 0/1/2, a preamble transmission power $P_{PRACH}$ is determined as $P_{PRACH}=\min\{P_{CMAX,c}(i),$ PREAMBLE_RECEIVED_TARGET_POWER+PL$_c\}$_[dBm], where $P_{CMAX,c}(i)$ is the configured UE transmit power for subframe i of serving cell c and $PL_c$ is the downlink path loss estimate calculated in the UE for serving cell c. For a BL/CE UE, $P_{PRACH}$ is set to $P_{CMAX,c}(i)$ for the highest PRACH coverage enhancement level 3.

Note that power ramping is used in random access preamble transmissions, and is described in TS 36.321, Section 5.1.3.

The random-access procedure shall be performed as follows:
set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
if the UE is a BL UE or a UE in enhanced coverage:
the PREAMBLE_RECEIVED_TARGET_POWER is set to: PREAMBLE_RECEIVED_TARGET_POWER−10*log 10(numRepetitionPerPreambleAttempt);

Objectives of Release 15 Work Item on Enhanced Support for Aerial Vehicles

In the 3GPP RAN #78 meeting, a Work Item (WI) on enhanced support for aerial vehicles was approved [4]. The objectives of the WI are to specify the following improvements for enhanced LTE support for aerial vehicles which are given below:

Specify enhancements to support improved mobility performance and interference detection in the following areas [RAN2]:

Enhancements to existing measurement reporting mechanisms such as definition of new events, enhanced triggering conditions, mechanisms to control the amount of measurement reporting.

Enhancements to mobility for aerial UEs such as conditional Handover (HO) and enhancements based on information such as location information, UE's airborne status, flight path plan, etc.

Specify enhancements to support indication of UE's airborne status and indication of the UE's support of Unmanned Aerial Vehicle (UAV) (or aerial UE) related functions in LTE network, e.g. UE radio capability [RAN2].

Signaling support for subscription based identification [RAN2 lead, RAN3]
  Specify S1/X2 signaling to support subscription based aerial UE identification
Specify uplink power control enhancements in the following areas [RAN1, RAN2]
  UE specific fractional pathloss compensation factor
  Extending the supported range of UE specific $P_O$ parameter Hence, the configuration of UE specific fractional pathloss compensation factor will be newly introduced in LTE Release 15. In addition, enhancements to support indication of UE's airborne status (for example, indication of whether the aerial UE is flying or not flying) will also be introduced in LTE Release 15.

Recent Agreements Release 15 WI on Enhanced Support for Aerial Vehicles

In RAN2 #101 meeting, the Release 15 LTE WI discussion started, and the following agreements were made:
  Introduce new measurement event/modify existing measurement events for interference detection
  Provide reference altitude information (including threshold) to UAV UE provided by eNB to assist UE to identify its status (i.e., airborne status).

The first agreement is about explicit flight mode (i.e., airborne status) detection where based on changed interference conditions, the aerial UE triggers a measurement report. From the measurement report, the eNB can deduce flight mode of the aerial UE. There have also been proposals where the eNB could poll the flight mode of the aerial UE.

The second agreement can be used in several ways but basically it gives a common reference point for UE and network that can be used to define airborne status of the aerial UE. It should be noted that it is optional for the network to configure the UE with the reference altitude information (including threshold value).

SUMMARY

Systems and methods are disclosed herein for uplink power control in a cellular communications network that are particularly well-suited for flying wireless devices (e.g., aerial User Equipments (UEs)). Embodiments of a method performed by a wireless device for uplink power control are disclosed. In some embodiments, the method comprises receiving, from a base station, reference altitude information comprising one or more height thresholds and detecting that a height of the wireless device is above a height threshold from among the one or more height thresholds. The method further comprises triggering and sending a measurement report to the base station upon detecting that the height of the wireless device is above the height threshold, and receiving, from the base station, an indication to use a particular one of two or more fractional pathloss compensation factors for uplink power control. The two or more fractional pathloss compensation factors for uplink power control comprising one or more wireless device specific fractional pathloss compensation factors for uplink power control. In some embodiments, the two or more fractional pathloss compensation factors further comprise one or more cell specific fractional pathloss compensation factors for uplink power control. In this manner, the uplink transmit power of the wireless device can be adapted to the actual height of the wireless device such that a good wireless device throughput is achieved while keeping low interference to neighbor cells.

In some embodiments, the method further comprises performing one or more uplink power control related tasks based on the flying mode status of the wireless device. In some embodiments, performing the one or more uplink power control related tasks comprises performing uplink power control for an uplink transmission based on the particular one of the two or more fractional pathloss compensation factors indicted by the base station.

In some embodiments, performing the one or more uplink power control related tasks further comprises resetting power control adjustment states when there is a change in a flying mode status of the wireless device. In some embodiments, performing the one or more uplink power control related tasks further comprises resetting power control adjustment states when the indication to use the particular one of two or more fractional pathloss compensation factors for uplink power control is received.

In some embodiments, the uplink transmission is a Physical Uplink Shared Channel (PUSCH) transmission, and performing the one or more uplink power control related tasks based on the flying mode status of the wireless device comprises resetting accumulation of PUSCH power control adjustment state for a serving cell of the wireless device when a flying mode status of the wireless device changes. In some embodiments, the uplink transmission is a PUSCH transmission, and performing the one or more uplink power control related tasks based on the flying mode status of the wireless device comprises resetting accumulation of PUSCH power control adjustment state for a serving cell of the wireless device when the indication to use the particular one of two or more fractional pathloss compensation factors for uplink power control is received.

In some embodiments, the uplink transmission is a PUSCH transmission. In some other embodiments, the uplink transmission is a Sounding Reference Signal (SRS) transmission based on the particular one of the two or more fractional pathloss compensation factors. In some other embodiments, the uplink transmission is a Physical Random Access Channel (PRACH) transmission.

Embodiments of a wireless device are also disclosed. In some embodiments, a wireless device is adapted to receive, from a base station, reference altitude information comprising one or more height thresholds and detect that a height of the wireless device is above a height threshold from among the one or more height thresholds. The wireless device is further adapted to trigger and send a measurement report to the base station upon detecting that the height of the wireless device is above the height threshold and receive, from the base station, an indication to use a particular one of two or more fractional pathloss compensation factors for uplink power control. The two or more fractional pathloss compensation factors for uplink power control comprise one or more wireless device specific fractional pathloss compensation factors for uplink power control.

In some embodiments, a wireless device comprises one or more transceivers and processing circuitry associated with the one or more transceivers. The processing circuitry is configured to cause the wireless device to receive, from a base station, reference altitude information comprising one or more height thresholds and detect that a height of the wireless device is above a height threshold from among the one or more height thresholds. The processing circuitry is further configured to cause the wireless device to trigger and send a measurement report to the base station upon detecting that the height of the wireless device is above the height threshold and receive, from the base station, an indication to use a particular one of two or more fractional pathloss compensation factors for uplink power control. The two or more fractional pathloss compensation factors for uplink power control comprise one or more wireless device specific fractional pathloss compensation factors for uplink power control.

Embodiments of a method performed by a base station for uplink power control are also disclosed. In some embodiments, the method comprises sending, to a wireless device, reference altitude information comprising one or more height thresholds and receiving, from the wireless device, a measurement report that is based on the one or more height thresholds and is indicative of an uplink interface status or a flying mode status of the wireless device. The method further comprises sending, to the wireless device, an indication to use a particular one of two or more fractional pathloss compensation factors for uplink power control based on the uplink interface status or the flying mode status of the wireless device. The two or more fractional pathloss compensation factors for uplink power control comprise one or more wireless device specific fractional pathloss compensation factors for uplink power control. In some embodiments, the two or more fractional pathloss compensation factors further comprise one or more cell specific fractional pathloss compensation factors for uplink power control.

Embodiments of a base station are also disclosed. In some embodiments, a base station is adapted to send, to a wireless device, reference altitude information comprising one or more height thresholds and receive, from the wireless device, a measurement report that is based on the one or more height thresholds and is indicative of an uplink interface status or a flying mode status of the wireless device. The base station is further adapted to send, to the wireless device, an indication to use a particular one of two or more fractional pathloss compensation factors for uplink power control based on the uplink interface status or the flying mode status of the wireless device. The two or more fractional pathloss compensation factors for uplink power control comprise one or more wireless device specific fractional pathloss compensation factors for uplink power control. In some embodiments, the two or more fractional pathloss compensation factors further comprise one or more cell specific fractional pathloss compensation factors for uplink power control.

In some embodiments, a base station comprises processing circuitry configured to cause the base station to send, to a wireless device, reference altitude information comprising one or more height thresholds and receive, from the wireless device, a measurement report that is based on the one or more height thresholds and is indicative of an uplink interface status or a flying mode status of the wireless device. The processing circuitry is further configured to cause the base station to send, to the wireless device, an indication to use a particular one of two or more fractional pathloss compensation factors for uplink power control based on the uplink interface status or the flying mode status of the wireless device. The two or more fractional pathloss compensation factors for uplink power control comprise one or more wireless device specific fractional pathloss compensation factors for uplink power control. In some embodiments, the two or more fractional pathloss compensation factors further comprise one or more cell specific fractional pathloss compensation factors for uplink power control.

In some other embodiments, a method performed by a wireless device for uplink power control comprises determining a particular one of two or more fractional pathloss compensation factors to use for uplink power control based on a flying mode status of the wireless device. The two or more fractional pathloss compensation factors comprise a cell specific fractional pathloss compensation factor for uplink power control and a wireless device specific fractional pathloss compensation factor for uplink power control. The method further comprises performing one or more uplink power control related tasks based on the flying mode status of the wireless device, wherein performing the one or more uplink power control related tasks comprises performing uplink power control for an uplink transmission based on the particular one of the two or more fractional pathloss compensation factors.

In some embodiments, the method further comprises receiving, from the base station, configurations of the two or more fractional pathloss compensation factors for uplink power control comprising the cell specific fractional pathloss compensation factor for uplink power control and the wireless device specific fractional pathloss compensation factor for uplink power control.

In some embodiments, the method further comprises determining the flying mode status of the wireless device. In some embodiments, the method further comprises receiving, from the base station, reference altitude information, wherein determining the flying mode status of the wireless device comprises determining the flying mode status of the wireless device based on the reference altitude information. In some embodiments, the reference altitude information comprises one or more reference height thresholds. In some embodiments, the reference altitude information comprises two or more reference height thresholds.

In some embodiments, determining the particular one of two or more fractional pathloss compensation factors to use for uplink power control based on the flying mode status of the wireless device comprises indicating, to the base station, the flying mode status of the wireless device and receiving, from the base station, an indication to use the particular one of the two or more fractional pathloss compensation factors for uplink power control. In some embodiments, indicating, to the base station, the flying mode status of the wireless device comprises triggering and sending a measurement report to the base station when a height of the wireless device is above a reference height threshold from among the one or more reference height thresholds or the two or more reference height thresholds.

In some embodiments, performing the one or more uplink power control related tasks further comprises resetting power control adjustment states when the indication to use the particular one of two or more fractional pathloss compensation factors for uplink power control is received. In some embodiments, the uplink transmission is a PUSCH transmission, and performing the one or more uplink power control related tasks based on the flying mode status of the wireless device comprises resetting accumulation of PUSCH power control adjustment state for a serving cell of the wireless device when the indication to use the particular one of two or more fractional pathloss compensation factors for uplink power control is received.

In some embodiments, the indication to use the particular one of the two or more fractional pathloss compensation factors for uplink power control is based on Medium Access Control (MAC) Control Element (CE). In some other embodiments, the indication to use the particular one of the two or more fractional pathloss compensation factors for uplink power control is based on Downlink Control Information (DCI).

In some embodiments, performing the one or more uplink power control related tasks further comprises resetting power control adjustment states when there is a change in the flying mode status of the wireless device. In some embodiments, the uplink transmission is a PUSCH transmission, and performing the one or more uplink power control related tasks based on the flying mode status of the wireless device comprises resetting accumulation of PUSCH power control adjustment state for a serving cell of the wireless device when the flying mode status of the wireless device changes.

In some embodiments, the uplink transmission is a PUSCH transmission. In some other embodiments, the uplink transmission is a SRS transmission based on the particular one of the two or more fractional pathloss compensation factors. In some other embodiments, the uplink transmission is a PRACH transmission.

In some other embodiments, a wireless device is adapted to determine a particular one of two or more fractional pathloss compensation factors to use for uplink power control based on a flying mode status of the wireless device. The two or more fractional pathloss compensation factors comprise a cell specific fractional pathloss compensation factor for uplink power control and a wireless device specific fractional pathloss compensation factor for uplink power control. The wireless device is further adapted to perform one or more uplink power control related tasks based on the flying mode status of the wireless device, wherein performing the one or more uplink power control related tasks comprises performing uplink power control for an uplink transmission based on the particular one of the two or more fractional pathloss compensation factors.

In some other embodiments, a wireless device comprises one or more transceivers and processing circuitry associated with the one or more transceivers. The processing circuitry is configured to cause the wireless device to determine a particular one of two or more fractional pathloss compensation factors to use for uplink power control based on a flying mode status of the wireless device. The two or more fractional pathloss compensation factors comprise a cell specific fractional pathloss compensation factor for uplink power control and a wireless device specific fractional pathloss compensation factor for uplink power control. The processing circuitry is further configured to cause the wireless device to perform one or more uplink power control related tasks based on the flying mode status of the wireless device, wherein performing the one or more uplink power control related tasks comprises performing uplink power control for an uplink transmission based on the particular one of the two or more fractional pathloss compensation factors.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 9 through 11 illustrate example embodiments of a radio access node;

FIG. 18 is a flowchart illustrating a method implemented in a communication system in accordance with one embodiment on the present disclosure; and FIG. 19 is a flowchart illustrating a method implemented in a communication system in accordance with one embodiment of the present disclosure.

DETAILED DESCRIPTION

Figure 1:
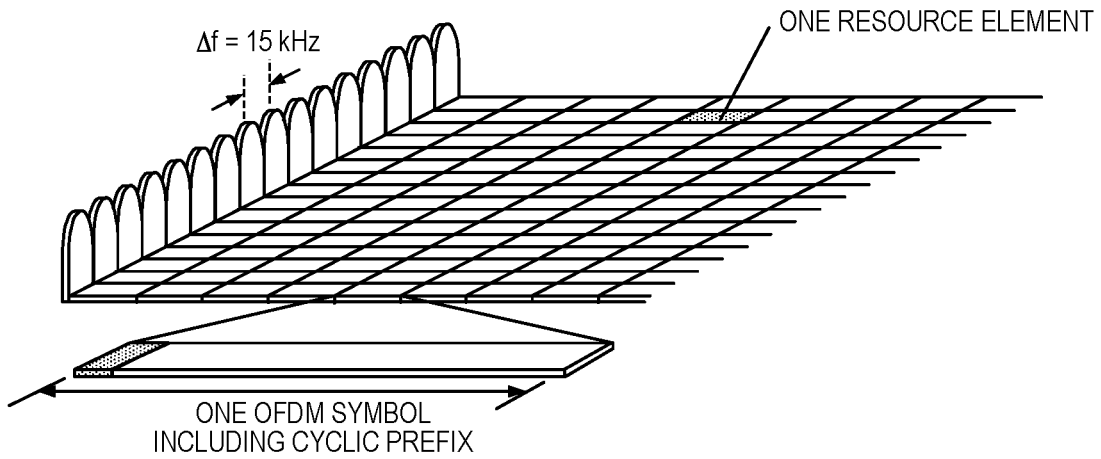
FIG. 1 illustrate the basic Long Term Evolution (LTE) physical resource, which can be seen as a time-frequency grid.
Figure 2:
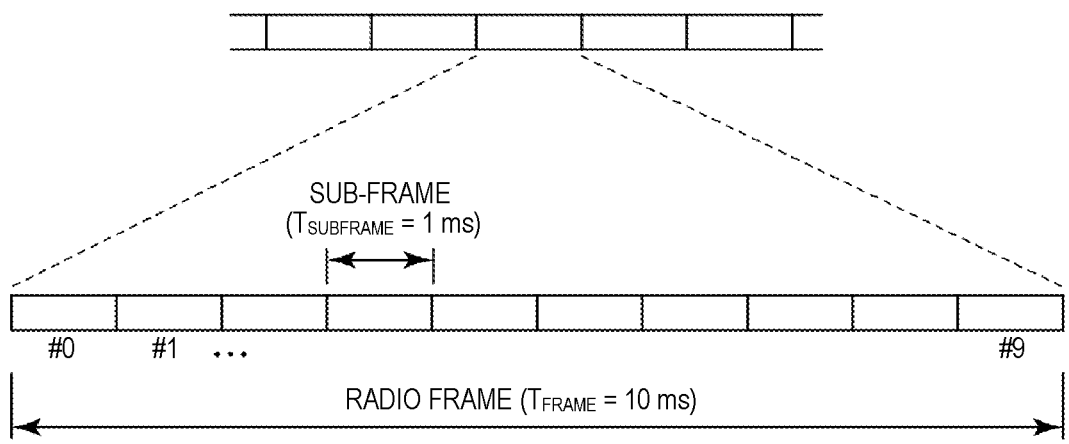
FIG. 2 illustrates a downlink radio frame for LTE.
Figure 3:
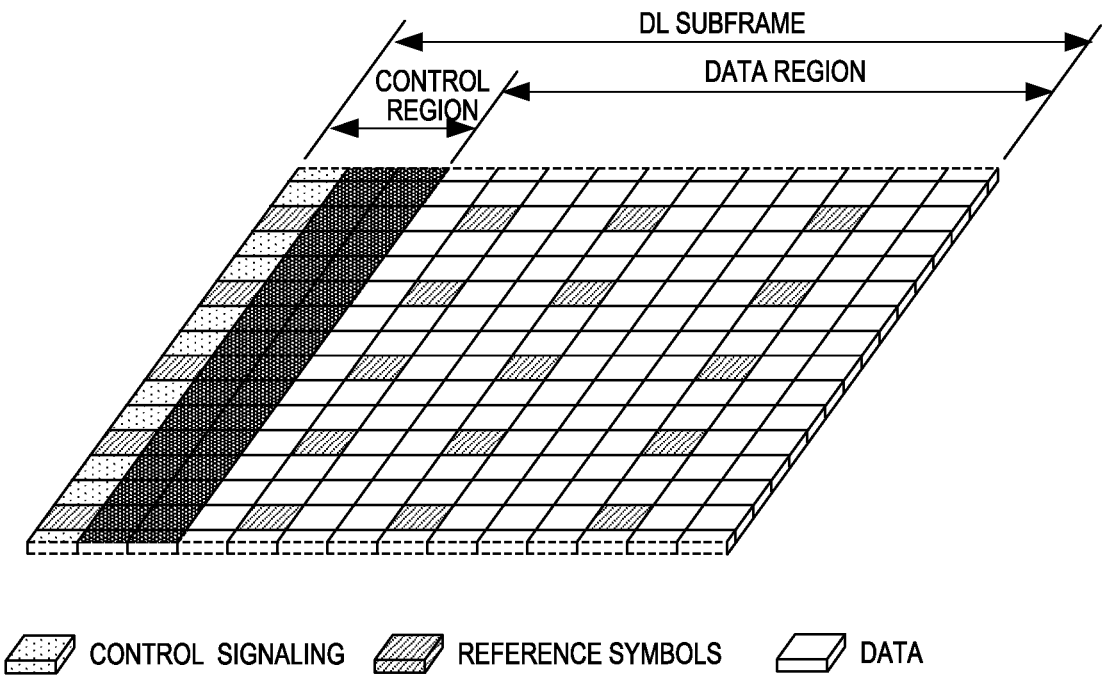
FIG. 3 illustrates a downlink system with three Orthogonal Frequency Division Multiplexing (OFDM) symbols as control.
Figure 4:
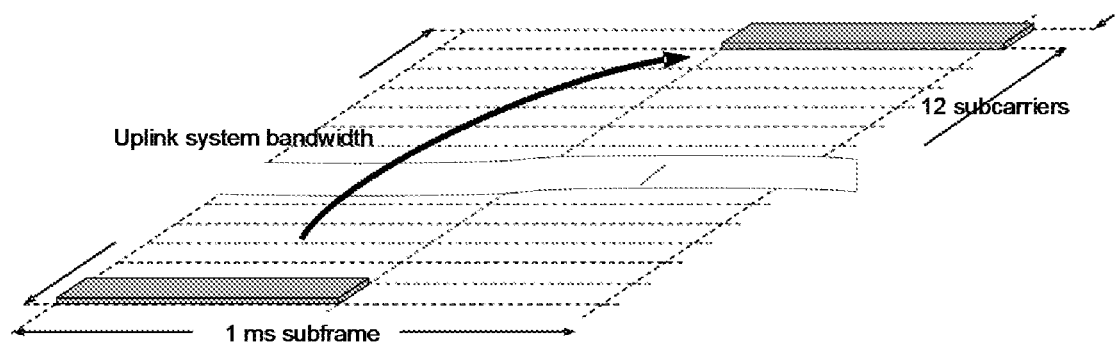
FIG. 4 illustrates resources assigned for uplink L1/L2 control.
Figure 5:
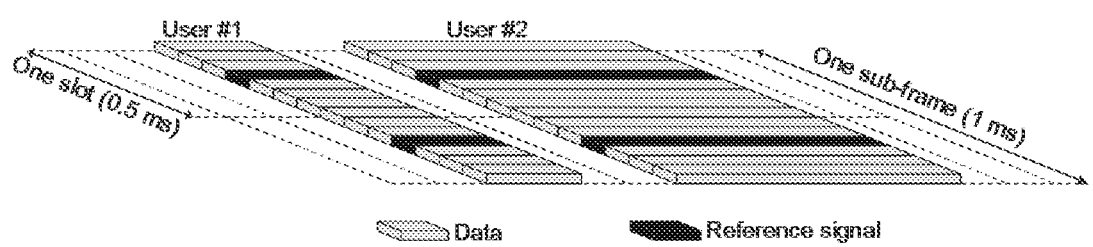
FIG. 5 illustrates an example of Physical Uplink Shared Channel (PUSCH) resource assignment to two users.
Figure 6:
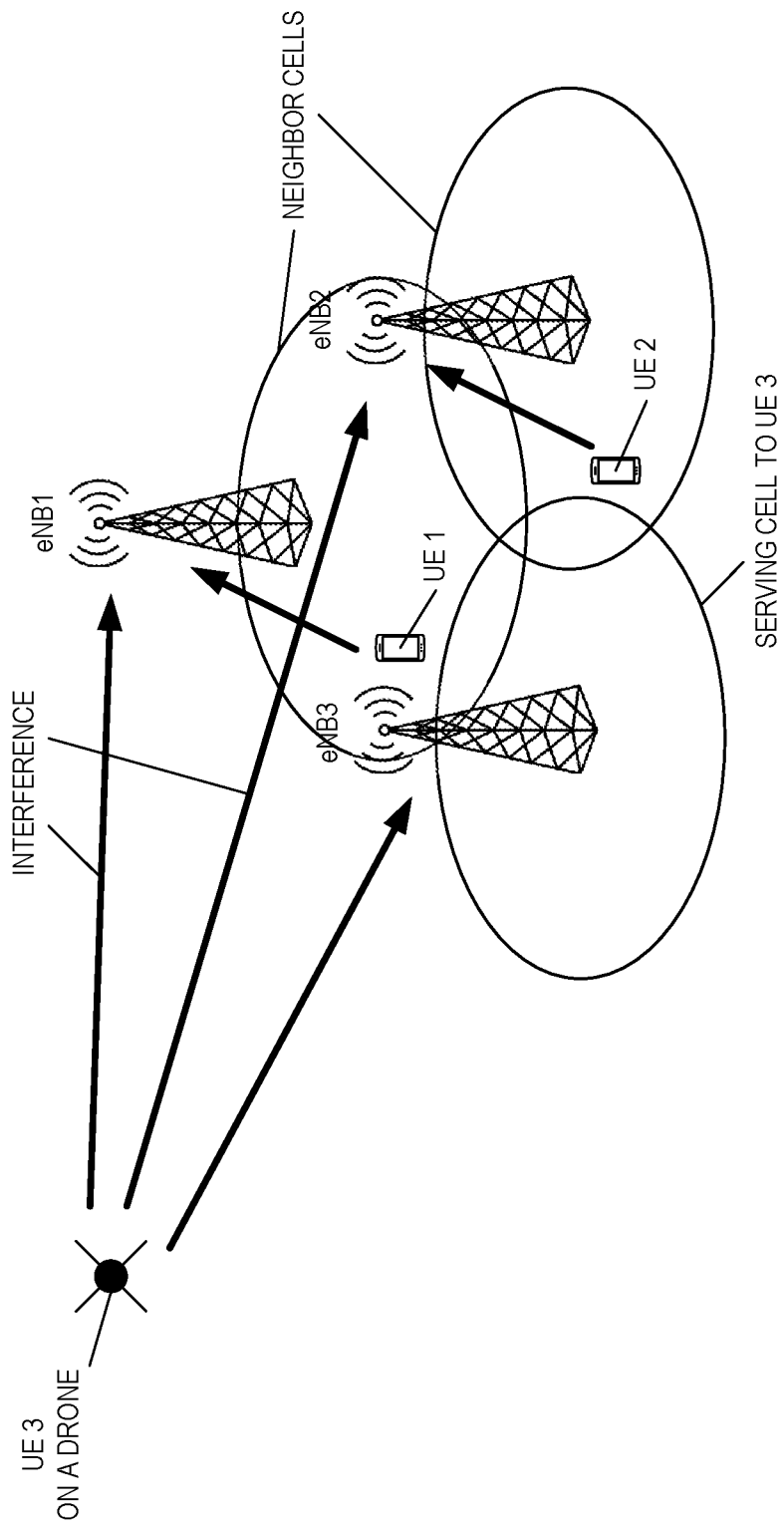
FIG. 6 illustrates an example of interference caused by aerial User Equipments (UEs) in an LTE network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., Session Management Function (SMF), a User Plane Function (UPF), an Access and Mobility Management Function (AMF), etc. in a 5G Core (5GC) and a Mobility Management Entity (MME), a Packet Data Network Gateway (P-GW), a Service Capability Exposure Function (SCEF), etc. in a Evolved Packet Core (EPC).

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) with regard to aerial UEs. When an aerial UE is configured with both cell-specific and UE specific fractional path loss compensation factors, there is a problem in that the aerial UE does not know how it should use these two fractional path loss compensation factors when the aerial UE has different airborne statuses. Another problem is that the aerial UE does not know how it should handle power control adjustment states when the aerial UE has different airborne statuses.

Certain aspects of the present disclosure and their embodiments may provide solutions to the aforementioned or other challenges.

In general, the following embodiments are described herein:

Embodiment 1/1b: One of a cell specific or a UE specific fractional pathloss compensation factor is selected by a UE in Physical Uplink Shared Channel (PUSCH) transmit power calculation according to the UE's flying or airborne status.

Embodiment 2/2b: One of a cell specific or a UE specific fractional pathloss compensation factor is selected by a UE in Sounding Reference Signal (SRS) transmit power calculation according to the UE's flying or airborne status for a serving cell that is configured for SRS transmission and not configured for PUSCH/Physical Uplink Control Channel (PUCCH) transmission.

Embodiment 3/3b: The closed loop power adjustment state is reset after change in the airborne status of the aerial UE.

Embodiment 4/4b: A UE specific fractional pathloss compensation factor is selected by a UE in Physical Random Access Channel (PRACH) transmit power calculation according to the UE's flying or airborne status. In some embodiments, two sets of PRACH power control related parameters are configured and which set is used depends on the UE's flying or airborne status.

Embodiment 5: A UE specific fractional pathloss compensation factor can be signaled as an offset to a cell specific one, and the sum of the two is used as the overall fractional pathloss compensation factor in uplink power control. Also, in some embodiments a set of UE specific fractional pathloss compensation factors can be configured to the UE, and one of the factor values from the set can be dynamically selected through Medium Access Control Control Element (MAC CE) signaling based on the UE's airborne status.

Additional details for these embodiments are provided below.

Certain embodiments may provide one or more of the following technical advantage(s). One advantage of embodiments described herein is that a UE's uplink PUSCH, SRS, and PRACH transmit power can be adapted to the actual UE height so that a good UE throughput is achieved while keeping low interference to neighbor cells. In addition, embodiments described herein also show how an aerial UE should handle power control adjustment states when the aerial UE has different airborne statuses. One of the offsets may be selected to be 0 such that MAC CE may select not to have any additional uplink power control value in addition to the cell specific one.

Figure 7:
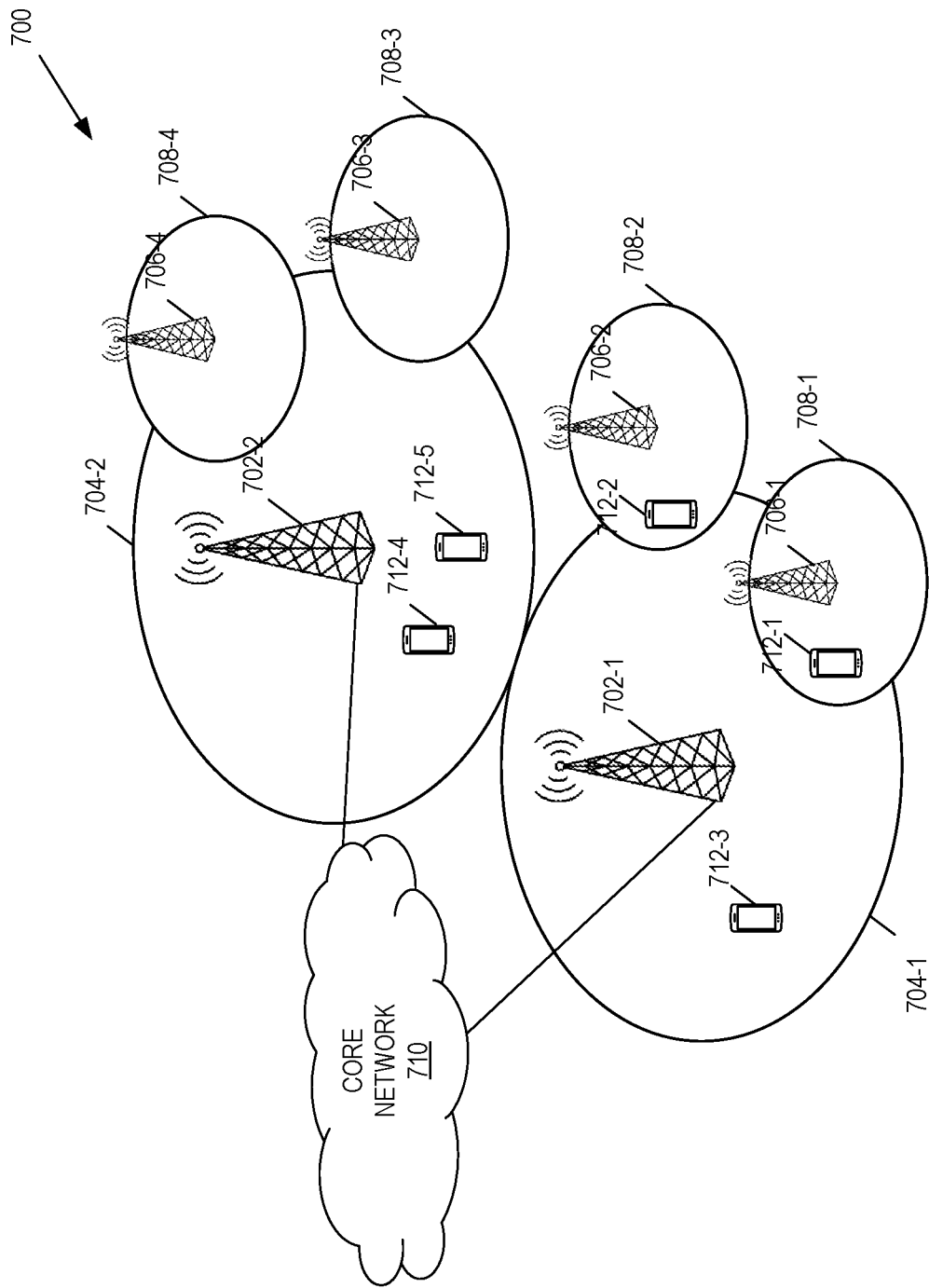
FIG. 7 illustrates one example of a cellular communications network in which embodiments of the present disclosure may be implemented.

FIG. 7 illustrates one example of a cellular communications network 700 in which embodiments of the present disclosure may be implemented. In the embodiments described herein, the cellular communications network 700 is a LTE network or 5G NR network. In this example, the cellular communications network 700 includes base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network 710.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs. At least some of the wireless devices 712 are aerial UEs (e.g., a drone UE or a UE attached to a drone or other flying machine).

Now, the description proceeds to a more detailed description of Embodiments 1/1b, 2/2b, 3/3b, 4/4b, and 5. Note that the description of these embodiments provided below is given as in LTE specification; however, similar structure is adopted in NR specifications and these embodiments apply to NR as well. In NR, a UE may be configured with cell specific or UE specific power control value in 3GPP Technical Specification (TS) 38.331. In NR, it is possible to define airborne status or height of the UE or uplink interference mode. Especially having MAC CEs to select Radio Resource Control (RRC) parameters or information elements applied by the UE has been adapted as in the NR specification.

Embodiment 1: PUSCH Transmit Power Control (TPC) Based on Aerial UE's Flying Status In this embodiment, an aerial UE is configured by the eNB with a cell specific fractional path loss compensation factor $\alpha_c(j)$ and a UE specific fractional path loss compensation factor $\alpha_{UE\_c}(j)$ for serving cell c for PUSCH transmission. Note that the aerial UE can be one of the wireless devices 712 of FIG. 7, and the eNB can be one of the base stations 702 of FIG. 7. In addition, the aerial UE is configured by the eNB with reference altitude information (including threshold) to assist the aerial UE to identify its airborne status. When the aerial UE is flying at an altitude above the reference altitude (i.e., threshold), the aerial UE determines that it is in flying mode. Note that there may be a set of reference height thresholds to determine different height ranges, e.g. a height range where UE is considered as terrestrial, a height range where there are likely mix of Line Of Sight (LOS)/Non-LOS (NLOS), and a height range where propagation is clearly LOS. The airborne status states (also referred to herein as the flying mode status states) may also be determined by using metrics other than height. For instance, the airborne status can be categorized as flying, hovering, or terrestrial (i.e., grounded). In some embodiments, the airborne status may also be determined using the speed of the aerial UE. The airborne mode can also be determined by the UE by counting the number of detected cells and there can be different categories. This can be called uplink interference tuning mode alternatively and it can be specified in addition to airborne mode.

In the following examples binary airborne status is used for simplicity but it can be based on any of the previously mentioned states.

Assuming the binary airborne status definition, in flying mode, the aerial UE has high probability of LOS condition to neighboring cells and may cause uplink interference to UEs being served by the neighboring cells. To control this uplink interference, the aerial UE follows the procedures given below:

When the aerial UE determines that it is in flying mode, and/or when the aerial UE indicates to the eNB that it is in flying mode, the aerial UE uses the UE specific fractional path loss compensation factor $\alpha_{UE\_c}(j)$ in Equation 1 for PUSCH transmissions or retransmissions scheduled using either a semi-persistent grant (j=0) or dynamic grant (j=1). By appropriately configuring the UE specific fractional path loss compensation factor $\alpha_{UE\_c}(j)$ (for example, by configuring a smaller $\alpha_{UE\_c}(j)$ than $\alpha_{UE\_c}(j)$, the uplink interference to neighboring cells from the aerial UE PUSCH transmissions or retransmissions corresponding to j=0 or j=1 can be controlled.

In some optional embodiments, when the aerial UE determines that it is in flying mode, and/or when the aerial UE indicates to the eNB that it is in flying mode, the aerial UE uses the UE specific fractional path loss compensation factor $\alpha_{UE\_c}(j)$ in Equation 1 for PUSCH transmissions or retransmissions scheduled using a random access response grant (j=2). It should be noted that for PUSCH transmissions or retransmissions scheduled using a random access grant, $\alpha_c(j)=1$ in current LTE specifications (see [2]). By appropriately configuring the UE specific fractional path loss compensation factor $\alpha_{UE\_c}(j)$ (for example, by configuring a smaller $\alpha_{UE\_c}(j)$ than 1), the uplink interference to neighboring cells from the aerial UE PUSCH transmissions or retransmissions corresponding to j=2 can be controlled.

When the aerial UE determines that it is in non-flying mode, and/or when the aerial UE indicates to the eNB that it is in non-flying mode, the aerial UE uses the cell specific fractional path loss compensation factor $\alpha_c(j)$ in Equation 1 for PUSCH transmissions or retransmissions scheduled using either a semi-persistent grant (j=0) or dynamic grant (j=1). For PUSCH transmissions or retransmissions scheduled using a random access grant (j=2), the aerial UE uses $\alpha_c(j)=1$ when it determines that it is in non-flying mode.

In the above procedures, aerial UE's indication of its flying/non-flying mode to the eNB may be done via RRC signaling.

The above procedures can also be applied to power control on SRS transmission in a serving cell c that is configured for PUSCH/PUCCH transmission in addition to SRS transmission.

Embodiment 1b

In this embodiment, an aerial UE is configured by the eNB with a cell specific fractional path loss compensation factor $\alpha_c(j)$ and a UE specific fractional path loss compensation factor $\alpha_{UE\_c}(j)$ for serving cell c for PUSCH transmission. In addition, to aid flight mode detection, the aerial UE can be configured by the eNB with measurement reporting enhancements to detect uplink interference or air-borne status. In the latter case, a measurement report is triggered and sent, for example, if the barometric pressure is smaller than a pressure threshold (i.e., similar to when UE height is above a height threshold), or if a certain faraway cell is seen (indicating UE is in high altitude with LOS to far away cells). To control this uplink interference, the aerial UE using this embodiment follows the procedures listed in Embodiment 1 above.

In some embodiments, upon detecting uplink interference or air-borne status of the aerial UE, the eNB dynamically indicates to the aerial UE which of the two (i.e., cell specific or UE specific) fractional path loss compensation factors the aerial UE should use in Equation 1 for PUSCH transmission. The dynamic indication can be based on MAC CE signaling or Downlink Control Information (DCI) based signaling. Upon receiving the dynamic indication, the aerial UE uses the indicated fractional pathloss compensation factor in Equation 1 for PUSCH transmission until another dynamic indication indicating a different fractional pathloss compensation factor is received.

Embodiment 2: SRS TPC Based on Aerial UE's Flying Status

In this embodiment, an aerial UE is configured by the eNB with a cell specific fractional path loss compensation factor $\alpha_{SRS,c}$ and a UE specific fractional path loss compensation factor $\alpha_{UE\_SRS\_c}$ for a Time Division Duplex (TDD) serving cell c configured for SRS transmission and not configured for PUSCH/PUCCH in a subframe. In addition, the aerial UE is configured by the eNB with reference altitude information (including threshold) to assist the aerial UE to identify its airborne status. When the aerial UE is flying at an altitude above the reference altitude (i.e., threshold), the aerial UE determines that it is in flying mode. In this mode, the aerial UE has high probability of LOS condition to neighboring cells and may cause uplink interference to UEs being served by the neighboring cells. To control this uplink interference, the aerial UE using this embodiment follows the procedures given below:

When the aerial UE determines that it is in flying mode, and/or when the aerial UE indicates to the eNB that it is in flying mode, the aerial UE uses the UE specific fractional path loss compensation factor $\alpha_{UE\_SRS\_c}$ in Equation 2 for SRS transmissions. By appropriately configuring the UE specific fractional path loss compensation factor $\alpha_{UE\_SRS\_c}$ (for example, by configuring a smaller $\alpha_{UE\_SRS\_c}$ than $\alpha_{SRS,c}$), the uplink interference to neighboring cells from the aerial UE SRS transmissions can be controlled.

When the aerial UE determines that it is in non-flying mode, and/or when the aerial UE indicates to the eNB that it is in non-flying mode, the aerial UE uses the cell specific fractional path loss compensation factor $\alpha_{SRS,c}$ in Equation 2 for SRS transmissions.

In the above procedures, aerial UE's indication of its flying/non-flying mode to the eNB may be done via RRC signaling.

Embodiment 2b

In this embodiment, an aerial UE is configured by the eNB with a cell specific fractional path loss compensation factor $\alpha_{SRS,c}$ and a UE specific fractional path loss compensation factor $\alpha_{UE\_SRS\_c}$ for a TDD serving cell c configured for SRS transmission and not configured for PUSCH/PUCCH. In addition, to aid flight mode detection, the aerial UE can be configured by the eNB with measurement reporting enhancements to detect uplink interference or air-borne status. In the latter case, a measurement report is triggered and sent, for example, if the barometric pressure is smaller than a pressure threshold (i.e., similar to when UE height is above a height threshold), or if a certain faraway cell is seen (indicating UE is in high altitude with LOS to far away cells). SRS transmission to neighboring cells needs to be controlled. To control this uplink interference, the aerial UE using this embodiment follows the procedures listed in Embodiment 2 above.

In some embodiments, upon detecting uplink interference or air-borne status of the aerial UE, the eNB dynamically indicates to the aerial UE which of the two (i.e., cell specific or UE specific) fractional path loss compensation factors the aerial UE should use in Equation 1 for SRS transmission. The dynamic indication can be based on MAC CE signaling or DCI based signaling. Upon receiving the dynamic indication, the aerial UE uses the indicated fractional pathloss compensation factor in Equation 2 for SRS transmission until another dynamic indication indicating a different fractional pathloss compensation factor is received.

Embodiment 3: Resetting Power Control Adjustment States after a Change of Aerial UE Airborne Status In this embodiment, an aerial UE is configured such that accumulation is enabled. In addition, the aerial UE is configured by the eNB with reference altitude information (including threshold) to assist the aerial UE to identify its airborne status. When the aerial UE is flying at an altitude above the reference altitude (i.e., threshold), the aerial UE determines that it is in flying mode. Since different power control parameters are likely to be used when the aerial UE is in flying mode when compared to non-flying mode, it is essential that the power control adjustment states for the serving cell be reset when the airborne status of the UE changes. In some specific embodiments, the UE resets accumulation of PUSCH power control adjustment state for the serving cell when the airborne status of the aerial UE changes (for example, from non-flying to flying and vice versa) and/or when the aerial UE sends an airborne status indication to the eNB. In another specific embodiment, the UE resets accumulation of SRS power control adjustment state for the serving cell when the airborne status of the aerial UE changes and/or when the aerial UE sends an airborne status indication to the eNB. In some embodiments, aerial UE's indication of its airborne status to the eNB is done via RRC signaling.

Embodiment 3b

In this embodiment, an aerial UE is configured such that accumulation is enabled. In addition, to aid flight mode detection, the aerial UE can be configured by the eNB with measurement reporting enhancements to detect uplink interference or air-borne status. In the latter case, a measurement report is triggered and sent, for example, if the barometric pressure is smaller than a pressure threshold (i.e., similar to when UE height is above a height threshold), or if a certain faraway cell is seen (indicating UE is in high altitude with LOS to far away cells). When the aerial UE determines that it is in flying or non-flying mode based on measurement events for interference detection, it is essential that the power control adjustment states for the serving cell be reset. This is because different power control parameters are likely to be used when the aerial UE is in flying mode when compared to non-flying mode. In some specific embodiments, the UE shall reset accumulation of PUSCH power control adjustment state for the serving cell when the airborne status of the aerial UE changes (for example, from non-flying to flying and vice versa). In another specific embodiment, the UE shall reset accumulation of SRS power control adjustment state for the serving cell when the airborne status of the aerial UE changes.

In some embodiments, upon detecting uplink interference or air-borne status of the aerial UE, the eNB dynamically indicates to the aerial UE which of the two (i.e., cell specific or UE specific) fractional path loss compensation factors the aerial UE should use for PUSCH/SRS transmission. The dynamic indication can be based on MAC CE signaling or DCI based signaling. In this case, the UE shall reset the accumulation of power control adjustment state for the serving cell when a dynamic indication is received which changes the currently used fractional pathloss compensation factor. In some alternative embodiments, the UE shall reset the accumulation of power control adjustment state for the serving cell whenever such a dynamic indication is received.

Embodiment 4: PRACH TPC Based on Aerial UE's Flying Status

In this embodiment, an aerial UE is configured by the eNB with a UE specific fractional path loss compensation factor $\alpha_{UE\_c}$ for serving cell c for PRACH transmission. In addition, the aerial UE is configured by the eNB with reference altitude information (including threshold) to assist the aerial UE to identify its airborne status. When the aerial UE is flying at an altitude above the reference altitude (i.e., threshold), the aerial UE determines that it is in flying mode. In this mode, the aerial UE has high probability of LOS condition to neighboring cells and may cause uplink interference to UEs being served by the neighboring cells. To control this uplink interference, the aerial UE follows the procedures given below:

When the aerial UE determines that it is in flying mode, and/or when the aerial UE indicates to the eNB that it is in flying mode, the aerial UE uses the UE specific fractional path loss compensation factor $\alpha_{UE\_c}$ to determine a preamble transmission power as $P_{PRACH}=\min\{P_{CMAX,c}(i), \text{PREAMBLE\_RECEIVED\_TARGET\_POWER}+\alpha_{UE\_c}PL_c\}\_[\text{dBm}]$ When the aerial UE determines that it is in non-flying mode, and/or when the aerial UE indicates to the eNB that it is in non-flying mode, the aerial UE uses $\alpha_{UE\_c}=1$, i.e., a preamble transmission power is $P_{PRACH}=\min\{P_{CMAX,c}(i), \text{PREAMBLE\_RECEIVED\_TARGET\_POWER}+PL_c\}\_[\text{dBm}]$ In an additional optional embodiment, the network configures two sets of parameters that include some or all of the parameters: premableInitialReceivedTargetPower, PREAMBLE_TRANSMISSION_COUNTER, powerRampingStep, numRepetitionPerPreambleAttempt When the aerial UE determines that it is in non-flying mode, and/or when the aerial UE indicates to the eNB that it is in non-flying mode, the aerial UE uses the first set of parameters to set PREAMBLE_RECEIVED_TARGET_POWER to preambleInitialReceivedTargetPower+DELTA_PREAMBLE+(PREAMBLE_TRANSMISSION_COUNTER-1) *powerRampingStep When the aerial UE determines that it is in flying mode, and/or when the aerial UE indicates to the eNB that it is in flying mode, the aerial UE uses the second set of parameters to set PREAMBLE_RECEIVED_TARGET_POWER to preambleInitialReceivedTargetPower+DELTA_PREAMBLE+(PREAMBLE_TRANSMISSION_COUNTER-1)*powerRampingStep If the aerial UE is a Bandwidth Limited (BL) UE or a UE in enhanced coverage:

When the UE determines that it is in non-flying mode, and/or when the aerial UE indicates to the eNB that it is in non-flying mode, the aerial UE uses numRepetitionPerPreambleAttempt in the first set of parameters to set the PREAMBLE_RECEIVED_TARGET_POWER is set to: PREAMBLE_RECEIVED_TARGET_POWER−10*log 10(numRepetitionPerPreambleAttempt)

When the UE determines that it is in flying mode, and/or when the aerial UE indicates to the eNB that it is in flying mode, the aerial UE uses numRepetitionPerPreambleAttempt in the second set of parameters to set the PREAMBLE_RECEIVED_TARGET_POWER is set to: PREAMBLE_RECEIVED_TARGET_POWER−10*log 10(numRepetitionPerPreambleAttempt)

In the above procedures, aerial UE's indication of its flying/non-flying mode to the eNB may be done via RRC signaling.

Embodiment 4b

In this embodiment, an aerial UE is configured by the eNB with a UE specific fractional path loss compensation factor $\alpha_{UE\_c}$ for serving cell c for PRACH transmission, and optionally two sets of parameters that include some or all of the parameters: preambleInitialReceivedTargetPower, PREAMBLE_TRANSMISSION_COUNTER, powerRampingStep, numRepetitionPerPreambleAttempt. In addition, to aid flight mode detection, the aerial UE can be configured by the eNB with measurement reporting enhancements to detect uplink interference or air-borne status. In the latter case, a measurement report is triggered and sent, for example, if the barometric pressure is smaller than a pressure threshold (i.e., similar to when UE height is above a height threshold), or if a certain faraway cell is seen (indicating UE is in high altitude with LOS to far away cells). When the aerial UE determines that it is in flying mode or cause high uplink interference, based on the measurement reporting configuration, the uplink interference from PRACH transmission to neighboring cells needs to be controlled. To control this uplink interference, the aerial UE using this embodiment follows the procedures listed in Embodiment 4 above.

Embodiment 5: Signaling UE Specific Fractional Path Loss Compensation Factor $\alpha_{UE\_c}(j)$ In one embodiment, the UE specific fractional path loss compensation factor $\alpha_{UE\_c}(j)$ (j=0,1) is signaled as a separate RRC parameter from the existing cell specific fractional path loss compensation factor $\alpha_c(j)$ (j=0,1). The same value range for $\alpha_c(j)$ can be used for $\alpha_{UE\_c}(j)$, i.e. $\alpha_{UE\_c}(j) \in (0, 0.4, 0.5, 0.6, 0.7, 0.8, 0.9, 1)$. Separate $\alpha_{UE\_c}(j)$ can be configured for PUSCH and SRS. Also, $\alpha_{UE\_c}(0)$ and $\alpha_{UE\_c}(1)$ can be the same configuration, i.e. $\alpha_{UE\_c}(0)=\alpha_{UE\_c}(1)$.

In another embodiment, $\alpha_{UE\_c}(j)$ is signaled as an offset to the cell specific $\alpha_c(j)$ and the overall fractional path loss compensation factor is the sum of $\alpha_c(j)$ and $\alpha_{UE\_c}(j)$, i.e. $\alpha_{sum,c}(j)=\alpha_c(j)+\alpha_{UE\_c}(j)$ and the sum is used in Equation 1 or 2. In this case, a smaller range can be used for $\alpha_{UE\_c}(j)$. For example, $\alpha_{UE\_c}(j) \in (0, -0.1, -0.2, -0.3)$. When an aerial UE is on the ground, below a certain height, or in a non-flying status, $\alpha_{UE\_c}(j)=0$ can be configured by RRC. Otherwise, one of the non-zero negative values can be configured by RRC for an aerial UE in a flying mode.

In a further embodiment, a set of values for $\alpha_{UE\_c}(j)$ can be configured to a UE. One of the values can be dynamically selected and signaled to the UE, e.g. by the eNB, based on the airborne or flying status of the UE. The dynamic signaling can be through MAC CE for fast power adjustment. In some embodiments, the dynamic signaling can be through DCI for fast power adjustment.

Additional Description

Figure 8:
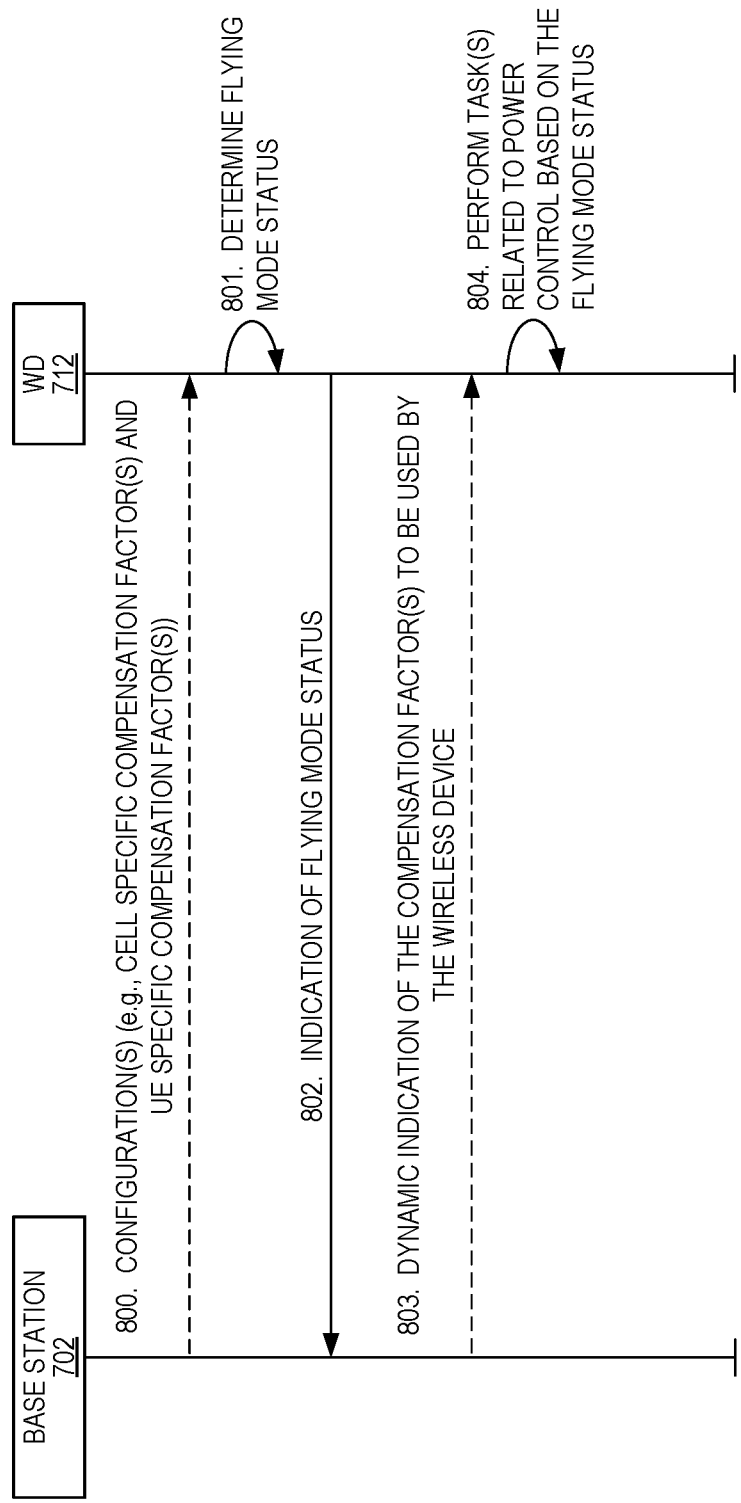
FIG. 8 illustrates the operation of a base station and a UE in accordance with at least some embodiments of the present disclosure.

FIG. 8 illustrates the operation of a base station 702 and a UE 712 in accordance with at least some of the embodiments described herein. Optional steps are illustrated with dashed lines. As illustrated, in some embodiments (e.g., in Embodiments 1, 1a, 2, 2a, 4, 4b, and 5), the base station 702 configures the UE 712 (i.e., sends one or more configurations to the UE 712) with one or more cell specific compensation factors and one or more UE specific compensation factors (step 800). For example, in Embodiments 1 and 1b, the base station 702 configures the UE 712 with a cell specific compensation factor and a UE specific compensation factor for a PUSCH transmission on a serving cell. In Embodiments 2 and 2b, the base station 702 configures the UE 712 with a cell specific compensation factor and a UE specific compensation factor for SRS transmission (with no PUSCH transmission) on the serving cell. In Embodiments 4 and 4b, the base station 702 configures the UE 712 with a cell specific compensation factor and a UE specific compensation factor for PRACH transmission. With respect to Embodiments 4 and 4b, the base station 702 may also configure different sets of PRACH transmission parameters for different flying mode statuses. Note that while discussed separately, any combination of two or more of Embodiments 1, 1b, 2, 2b, 3, 3b, 4, 4b, and 5 may be used.

As discussed above with respect to Embodiment 5, the signaling of the configurations may be performed, e.g., via RRC signaling or via a combination of RRC signaling and dynamic signaling. Further, the UE specific compensation factor(s) may be signaled as offsets relative to the respective cell specific compensation factor(s). Note that separate cell specific compensation factors and UE specific compensation factors may be configured for PUSCH, SRS, and/or PRACH.

In this embodiment, the UE 712 determines its flying mode status (step 801) and/or the UE 712 indicates its flying mode status, e.g., to the network node (step 802). As discussed above, in some embodiment, the UE 712 determines its flying mode status by comparing its altitude with configured altitude threshold. In some other embodiments, the UE 712 determines its flying mode status based on measurement events for interference detection. As discussed herein, the flying mode status is determined to be either flying mode or non-flying mode.

As discussed above, in some embodiments, the base station 702 sends a dynamic indication of the cell specific compensation factor(s) and/or the UE specific compensation factor(s) to be used by the UE 712 (step 803). This indication can be independent of or before performing the power control related task in step 804.

The UE 712 performs one or more uplink power control related tasks based on determined the flying mode status of the UE 712 (step 804). As discussed above, in Embodiments 1, 1b, 2, 2b, 4, and 4b, the UE 712 applies either a configured cell specific compensation factor or a configured UE specific compensation factor when determining a transmit power based on the flying mode status. As discussed above, in Embodiments 1 and 1b, the UE 712 applies either a configured cell specific compensation factor or a configured UE specific compensation factor when determining a transmit power for PUSCH transmission based on the flying mode status of the UE 712. In Embodiments 2 and 2b, the UE 712 applies either a configured cell specific compensation factor or a configured UE specific compensation factor when determining a transmit power for SRS transmission based on the flying mode status of the UE 712. In Embodiments 4 and 4b, the UE 712 applies either a configured cell specific compensation factor or a configured UE specific compensation factor when determining a transmit power for PRACH transmission based on the flying mode status of the UE 712.

As also discussed above, in Embodiments 3 and 3b, the UE 712 resets power control adjustment states when there is a change in flying mode status (e.g., reset accumulation of PUSCH power control adjustment state for the serving cell when the airborne status of the aerial UE changes).

Further, in Embodiments 4 and 4b, the UE 712 is (optionally) additionally configured with different sets of PRACH transmission parameters for flying mode and non-flying mode. The UE 712 then applies the appropriate set of PRACH transmission parameters for PRACH transmission based on the UE's flying mode status.

Figure 9:
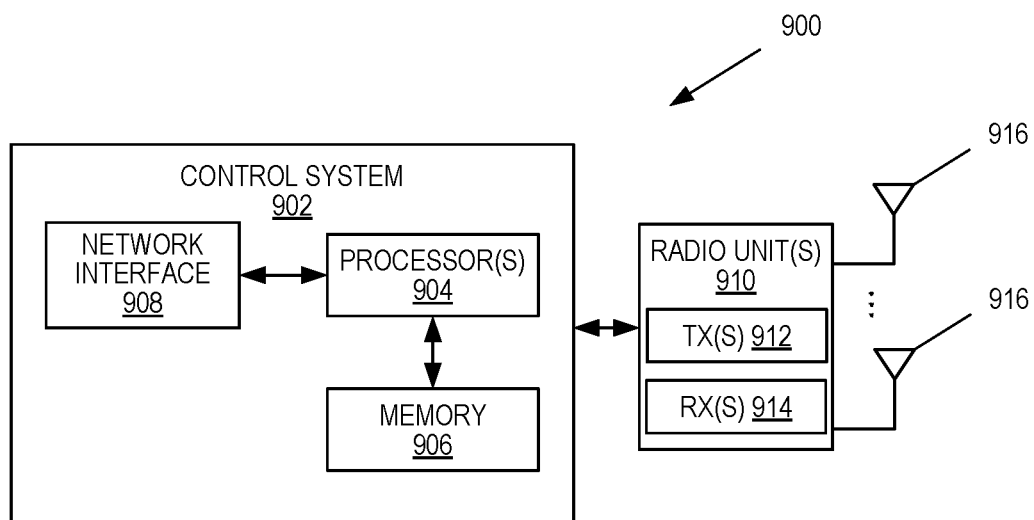

FIG. 9 is a schematic block diagram of a radio access node 900 according to some embodiments of the present disclosure. The radio access node 900 may be, for example, a base station 702 or 706. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 includes one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
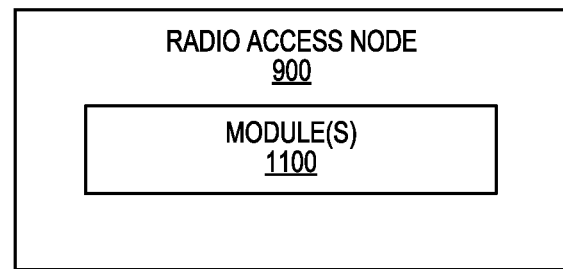

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
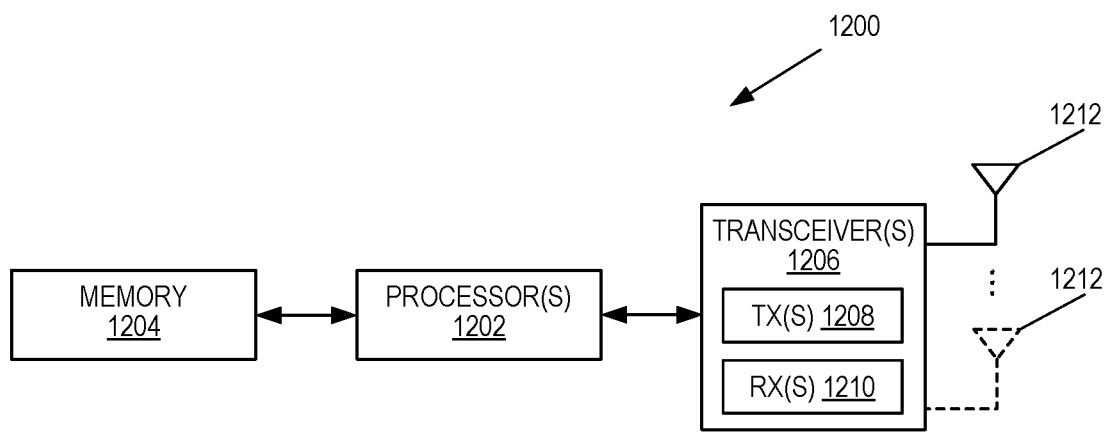
FIGS. 12 and 13 illustrate example embodiments of a UE.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The processors 1202 are also referred to herein as processing circuitry. The transceivers 1206 are also referred to herein as radio circuitry. In some embodiments, the functionality of the UE 1200 described above may be fully or partially implemented in software that is, e.g., stored in the memory 1204 and executed by the processor(s) 1202. Note that the UE 1200 may include additional components not illustrated in FIG. 12 such as, e.g., one or more user interface components (e.g., a display, buttons, a touch screen, a microphone, a speaker(s), and/or the like), a power supply (e.g., a battery and associated power circuitry), etc.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
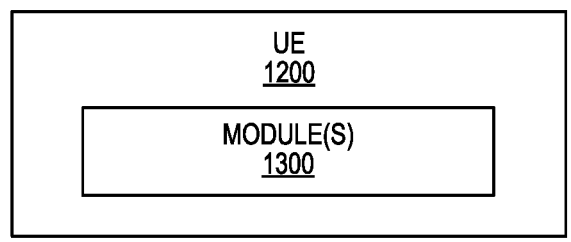

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
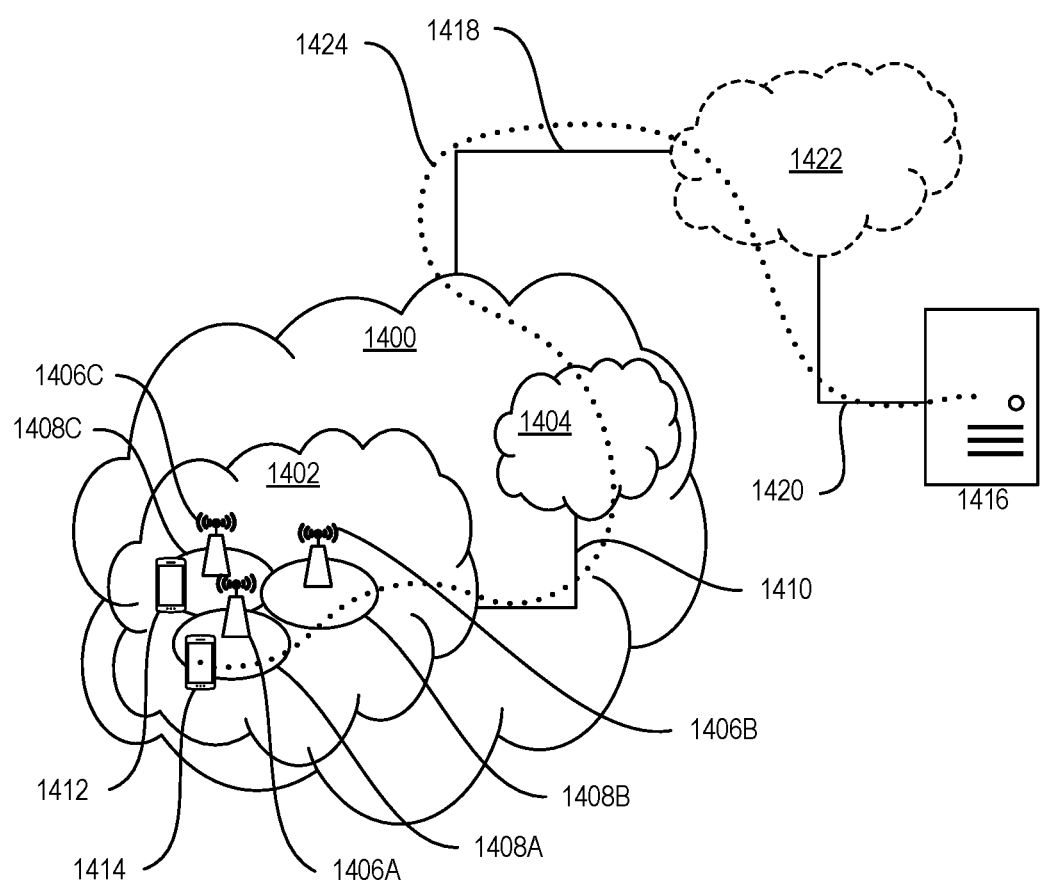
FIG. 14 illustrates a telecommunication network connected via an intermediate network to a host computer in accordance with some embodiments of the present disclosure.

With reference to FIG. 14, in accordance with an embodiment, a communication system includes a telecommunication network 1400, such as a 3GPP-type cellular network, which comprises an access network 1402, such as a Radio Access Node (RAN), and a core network 1404. The access network 1402 comprises a plurality of base stations 1406A, 1406B, 1406C, such as NBs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
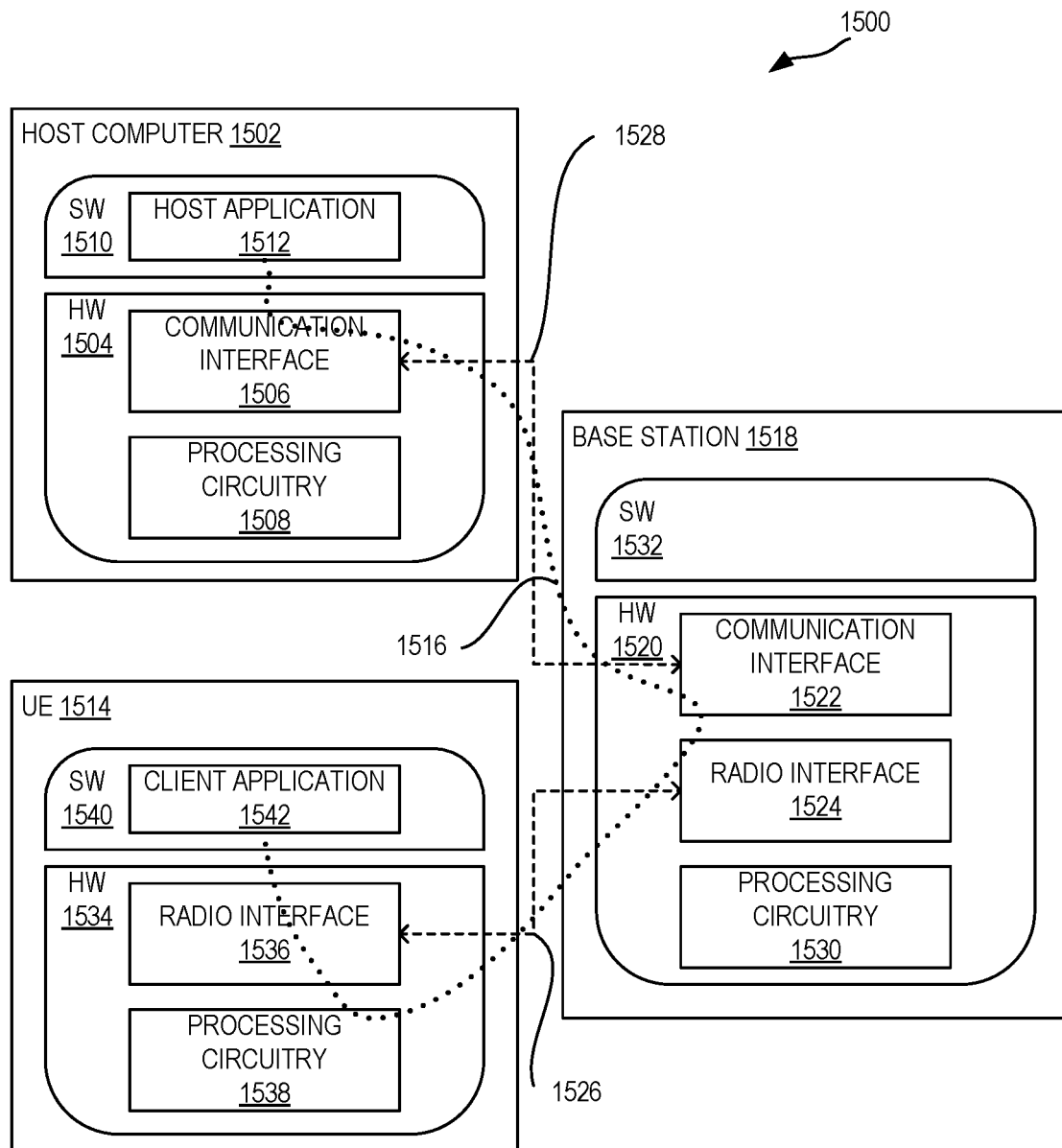
FIG. 15 is a generalized block diagram of a host computer communicating via a base station with a UE over a partially wireless connection in accordance with some embodiments of the present disclosure.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1514, and it may be unknown or imperceptible to the base station 1514. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
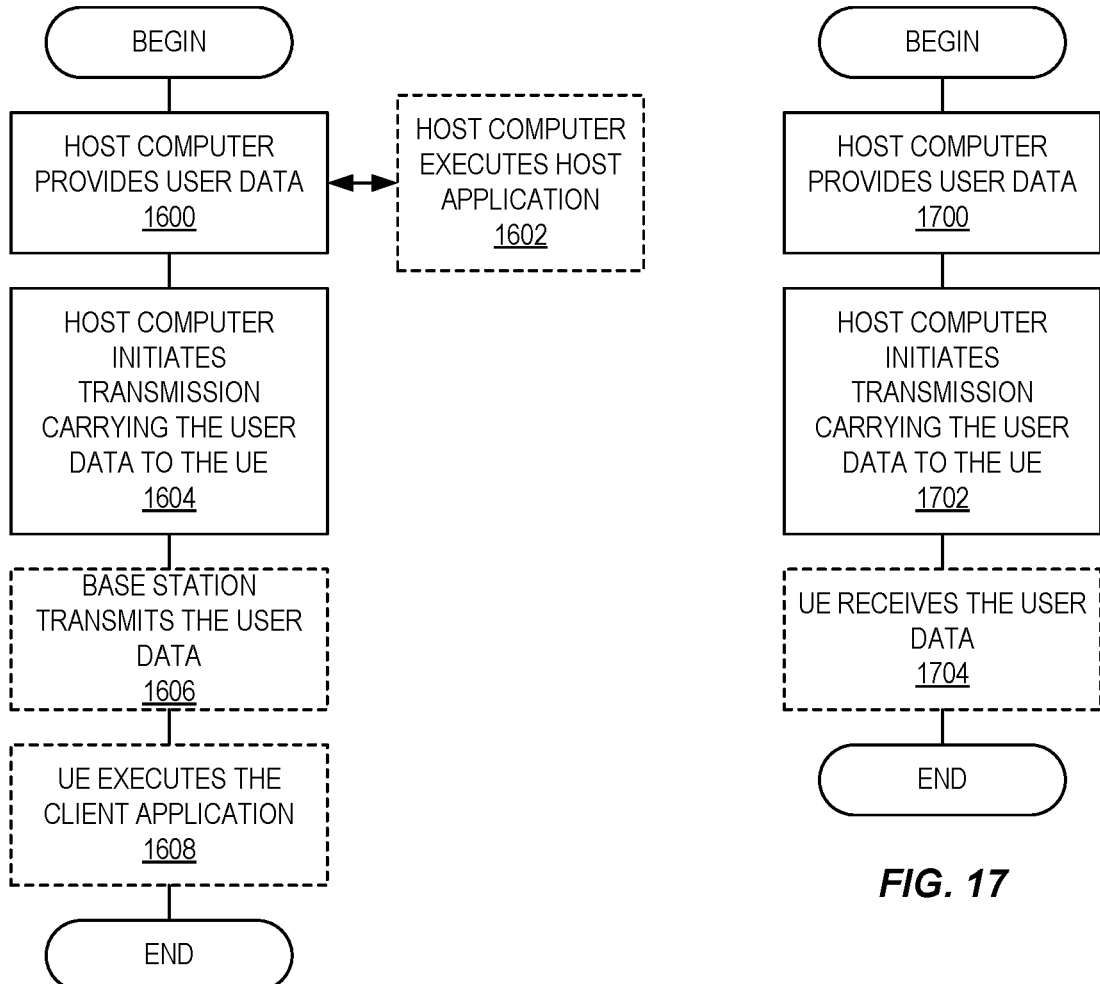
FIG. 16 is a flowchart illustrating a method implemented in a communication system in accordance with one embodiment of the present disclosure.
FIG. 17 is a flowchart illustrating a method implemented in a communication system in accordance with one embodiment of the present disclosure.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure include the following.

Group A Embodiments

Embodiment 1: A method performed by a wireless device (712) for transmission power control, the method comprising at least one of: determining (801) a flying mode status of the wireless device (712) and/or indicating (802) a flying mode status of the wireless device (712) (e.g., to a network node); and performing (804) one or more uplink power control related tasks based on the flying mode status of the wireless device (712).

Embodiment 2: The method of embodiment 1 further comprising: receiving (800), from a network node (702), one or more of a configuration of a cell specific compensation factor and a User Equipment, UE, specific compensation factor; optionally, wherein performing (804) the one or more uplink power control related tasks based on the flying mode status of the wireless device (712) comprises using either the cell specific compensation factor or the UE specific compensation factor for power control for a transmission based on the flying mode status of the wireless device (712).

Embodiment 3: The method of embodiment 2 wherein the transmission is a Physical Uplink Shared Channel, PUSCH, transmission.

Embodiment 4: The method of embodiment 2 wherein the transmission is a Sounding Reference Signal, SRS, transmission.

Embodiment 5: The method of embodiment 2 wherein the transmission is a Physical Random Access Channel, PRACH, transmission.

Embodiment 6: The method of any one of embodiments 2 to 5 wherein using either the cell specific compensation factor or the UE specific compensation factor for power control for the transmission based on the flying mode status of the wireless device (712) comprises: using the cell specific compensation factor for power control for the transmission if the flying mode status of the wireless device (712) is non-flying mode; and using the UE specific compensation factor for power control for the transmission if the flying mode status of the wireless device (712) is flying mode.

Embodiment 7: The method of any one of embodiments 1 to 6 wherein performing (804) the one or more uplink power control related tasks based on the flying mode status of the wireless device (712) comprises at least one of: resetting power control adjustment states when there is a change in the flying mode status of the wireless device (712); and resetting power control adjustment states when a dynamic indication is received indicating the compensation factor to be used by the wireless device (712) for power control.

Embodiment 8: The method of embodiment 7 wherein the dynamic indication is based on MAC CE.

Embodiment 9: The method of embodiment 7 wherein the dynamic indication is based on DCI.

Embodiment 10: The method of any one of embodiments 1 to 6 wherein performing (804) the one or more uplink power control related tasks based on the flying mode status of the wireless device (712) comprises at least one of: resetting accumulation of PUSCH power control adjustment state for a serving cell of the wireless device (712) when the flying mode status of the wireless device (712) changes; and resetting accumulation of PUSCH power control adjustment state for a serving cell of the wireless device (712) when a dynamic indication is received indicating the compensation factor to be used by the wireless device (712) for PUSCH power control.

Embodiment 11: The method of embodiment 10 wherein the dynamic indication is based on MAC CE.

Embodiment 12: The method of embodiment 10 wherein the dynamic indication is based on DCI.

Embodiment 13: The method of embodiment 1 further comprising: receiving (800), from a network node (702), a configuration of a first set of PRACH transmission parameters for flying mode and a second set of PRACH transmission parameters for non-flying mode; optionally, wherein performing (804) the one or more uplink power control related tasks based on the flying mode status of the wireless device (712) comprises using either the first set of PRACH transmission parameters for PRACH transmission or the second set of PRACH transmission parameters for PRACH transmission based on the flying mode status of the wireless device (712).

Embodiment 14: The method of any one of claims 22 to 26 and 31 wherein receiving the configuration of the cell specific compensation factor and the UE specific compensation factor and/or receiving the configuration of the first set of PRACH transmission parameters for flying mode and the second set of PRACH transmission parameters for non-flying mode comprises: receiving the configuration via Radio Resource Control, RRC, signaling.

Embodiment 15: The method of embodiment 14 wherein the cell specific compensation factor and the UE specific compensation factor are signaled as separate parameters.

Embodiment 16: The method of embedment 14 wherein the UE specific compensation factor is signaled as an offset from the cell specific compensation factor.

Embodiment 17: The method of any one of embodiments 2 to 6 wherein: receiving (800), from the network node (702), the configuration of the cell specific compensation factor and the UE specific compensation factor comprises receiving, from the network node (702), a configuration of a set of UE specific compensation factors; and the method further comprises receiving (803), from the network node (702) via dynamic signaling, an indication of one of the set of UE specific compensation factors to use as the UE specific compensation factor.

Embodiment 18: The method of 17 wherein the dynamic signaling is through a MAC CE.

Embodiment 19: The method of 17 wherein the dynamic signaling is through DCI.

Embodiment 20: The method of any of the previous embodiments, further comprising: providing user data; and forwarding the user data to a host computer via a transmission to a base station in a radio access network.

Group B Embodiments

Embodiment 21: A method performed by a base station (702) for transmission power control, the method comprising at least one of: providing (800), to a wireless device (712), a configuration of a cell specific compensation factor and/or a User Equipment, UE, specific compensation factor to be used by the wireless device (712) for power control for a transmission; and receiving (802), from the wireless device (712), an indication of a flying mode status of the wireless device (712).

Embodiment 22: The method of embodiment 21 further comprising receiving the transmission from the wireless device (712).

Embodiment 23: The method of embodiment 21 or 22 wherein the cell specific compensation factor is to be used by the wireless device (712) if the wireless device (712) is in a non-flying mode and the UE specific compensation factor is to be used by the wireless device (712) if the wireless device (712) is in a flying mode.

Embodiment 24: The method of any one of embodiments 21 to 23 wherein the transmission is a Physical Uplink Shared Channel, PUSCH, transmission.

Embodiment 25: The method of any one of embodiments 21 to 23 wherein the transmission is a Sounding Reference Signal, SRS, transmission.

Embodiment 26: The method of any one of embodiments 21 to 23 wherein the transmission is a Physical Random Access Channel, PRACH, transmission.

Embodiment 27: The method of any one of embodiments 21 to 26 further comprising: providing (800), to the wireless device (712), a configuration of a first set of PRACH transmission parameters for flying mode and a second set of PRACH transmission parameters for non-flying mode.

Embodiment 28: The method of any one of embodiments 22 to 28 wherein providing the configuration of the cell specific compensation factor and/or the UE specific compensation factor and/or providing the configuration of the first set of PRACH transmission parameters for flying mode and the second set of PRACH transmission parameters for non-flying mode comprises: providing the configuration via Radio Resource Control, RRC, signaling.

Embodiment 29: The method of embodiment 28 wherein the cell specific compensation factor and the UE specific compensation factor are signaled as separate parameters.

Embodiment 30: The method of embodiment 28 wherein the UE specific compensation factor is signaled as an offset from the cell specific compensation factor.

Embodiment 31: The method of any one of embodiments 21 to 27 wherein: providing (800) the configuration of the cell specific compensation factor and the UE specific compensation factor comprises providing, to the wireless device (712), a configuration of a set of UE specific compensation factors; and the method further comprises providing (803), to the wireless device (712) via dynamic signaling, an indication of one of the set of UE specific compensation factors to use as the UE specific compensation factor.

Embodiment 32: The method of 31 wherein the dynamic signaling is through a MAC CE.

Embodiment 33: The method of 31 wherein the dynamic signaling is through DCI.

Embodiment 34: The method of any of the previous embodiments, further comprising: obtaining user data; and forwarding the user data to a host computer or a wireless device.

Group C Embodiments

Embodiment 35: A wireless device (712) for transmission power control, the wireless device (712) comprising: processing circuitry (1202) configured to perform any of the steps of any of the Group A embodiments; and power supply circuitry configured to supply power to the wireless device (712).

Embodiment 36: A base station (702) for transmission power control, the base station (702) comprising: processing circuitry (904, 1004) configured to perform any of the steps of any of the Group B embodiments; and power supply circuitry configured to supply power to the base station (702).

Embodiment 37: A User Equipment, UE, for transmission power control, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 38: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 39: The communication system of the previous embodiment further including the base station.

Embodiment 40: The communication system of the previous 2 embodiments, further including the UE, wherein the UE is configured to communicate with the base station.

Embodiment 41: The communication system of the previous 3 embodiments, wherein: the processing circuitry of the host computer is configured to execute a host application, thereby providing the user data; and the UE comprises processing circuitry configured to execute a client application associated with the host application.

Embodiment 42: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 43: The method of the previous embodiment, further comprising, at the base station, transmitting the user data.

Embodiment 44: The method of the previous 2 embodiments, wherein the user data is provided at the host computer by executing a host application, the method further comprising, at the UE, executing a client application associated with the host application.

Embodiment 45: A User Equipment, UE, configured to communicate with a base station, the UE comprising a radio interface and processing circuitry configured to perform the method of the previous 3 embodiments.

Embodiment 46: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 47: The communication system of the previous embodiment, wherein the cellular network further includes a base station configured to communicate with the UE.

Embodiment 48: The communication system of the previous 2 embodiments, wherein: the processing circuitry of the host computer is configured to execute a host application, thereby providing the user data; and the UE's processing circuitry is configured to execute a client application associated with the host application.

Embodiment 49: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 50: The method of the previous embodiment, further comprising at the UE, receiving the user data from the base station.

Embodiment 51: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 52: The communication system of the previous embodiment, further including the UE.

Embodiment 53: The communication system of the previous 2 embodiments, further including the base station, wherein the base station comprises a radio interface configured to communicate with the UE and a communication interface configured to forward to the host computer the user data carried by a transmission from the UE to the base station.

Embodiment 54: The communication system of the previous 3 embodiments, wherein: the processing circuitry of the host computer is configured to execute a host application; and the UE's processing circuitry is configured to execute a client application associated with the host application, thereby providing the user data.

Embodiment 55: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 56: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 57: The method of the previous embodiment, further comprising, at the UE, providing the user data to the base station.

Embodiment 58: The method of the previous 2 embodiments, further comprising: at the UE, executing a client application, thereby providing the user data to be transmitted; and at the host computer, executing a host application associated with the client application.

Embodiment 59: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 60: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 61: The communication system of the previous embodiment further including the base station.

Embodiment 62: The communication system of the previous 2 embodiments, further including the UE, wherein the UE is configured to communicate with the base station.

Embodiment 63: The communication system of the previous 3 embodiments, wherein: the processing circuitry of the host computer is configured to execute a host application; and the UE is configured to execute a client application associated with the host application, thereby providing the user data to be received by the host computer.

Embodiment 64: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 65: The method of the previous embodiment, further comprising at the base station, receiving the user data from the UE.

Embodiment 66: The method of the previous 2 embodiments, further comprising at the base station, initiating a transmission of the received user data to the host computer.

Group D Embodiments

Embodiment 67: A method of power control which depends on the airborne status (i.e., the flying mode status) of a User Equipment, UE, wherein at least one of the following depends on the airborne status:
  a. One of the cell specific or the UE specific fractional pathloss compensation factor is selected by a UE in Physical Uplink Shared Channel, PUSCH, transmit power calculation according to the UE's flying or airborne status (Embodiment 1/1b);
  b. One of the cell specific or the UE specific fractional pathloss compensation factor is selected by a UE in Sounding Reference Signal, SRS, transmit power calculation according to the UE's flying or airborne status for a serving cell that is configured for SRS transmission and not configured for PUSCH/Physical Uplink Control Channel, PUCCH, transmission (Embodiment 2/2b);
  c. The closed loop power adjustment state is reset after change in the airborne status of the UE (Embodiment 3/3b);
  d. The UE specific fractional pathloss compensation factor is selected by a UE in Physical Random Access Channel, PRACH, transmit power calculation according to the UE's flying or airborne status. In some embodiments, two sets of PRACH power control related parameters are configured and which set is used depends on the UE's flying or airborne status (Embodiment 4/4b); and
  e. the UE specific fractional pathloss compensation factor can be signaled as an offset to the cell specific one and the sum of the two is used as the overall fractional pathloss compensation factor in uplink power control. Also, in some embodiments a set of UE specific fractional pathloss compensation factors can be configured to the UE, and one of the factor values from the set can be dynamically selected through either Medium Access Control Control Element, MAC CE, or Downlink Control Information, DCI, signaling based on the UE's airborne status (Embodiment 5).

At least some of the following abbreviations may be used in this disclosure. If there is an inconsistency between abbreviations, preference should be given to how it is used above. If listed multiple times below, the first listing should be preferred over any subsequent listing(s).
  3GPP Third Generation Partnership Project
  5G Fifth Generation
  5GC Fifth Generation Core
  ACK Acknowledgement
  AMF Access and Mobility Management Function
  AP Access Point
  ASIC Application Specific Integrated Circuit
  BL Bandwidth Limited
  CE Coverage Enhancement
  CPU Central Processing Unit
  dB Decibel
  dBm Decibel-Milliwatt
  DCI Downlink Control Information
  DFT Discrete Fourier Transform
  DSP Digital Signal Processor
  eNB Enhanced or Evolved Node B
  EPC Evolved Packet Core
  EPDCCH Enhanced Physical Downlink Control Channel
  FDD Frequency Division Duplex
  FPGA Field Programmable Gate Array
  gNB New Radio Base Station
  HARQ Hybrid Automatic Repeat Request
  HO Handover
  LAA License Assisted Access
  LOS Line Of Sight
  LTE Long Term Evolution
  MAC Medium Access Control
  MAC CE MAC Control Element
  MCS Modulation and Coding Scheme
  MIMO Multiple Input Multiple Output
  MME Mobility Management Entity
  ms Millisecond
  MTC Machine Type Communication
  NACK Negative Acknowledgement
  NB-IoT Narrowband Internet of Things
  NLOS Non-Line of Sight
  NR New Radio
  OFDM Orthogonal Frequency Division Multiplexing
  OTT Over-the-Top
  PDCCH Physical Downlink Control Channel
  PDSCH Physical Downlink Shared Channel
  P-GW Packet Data Network Gateway
  PRACH Physical Random Access Channel
  PUCCH Physical Uplink Control Channel
  PUSCH Physical Uplink Shared Channel
  RAM Random Access Memory
  RAN Radio Access Node
  RB Resource Block
  ROM Read Only Memory
  RRC Radio Resource Control
  RRH Remote Radio Head RSRP Reference Signal Received Power
SCEF Service Capability Exposure Function
SINR Signal to Noise Ratio
SMF Session Management Function
SRS Sounding Reference Signal
TDD Time Division Duplex
TPC Transmit Power Control
TR Technical Report
TS Technical Specification
UAV Unmanned Aerial Vehicle
UCI Uplink Control Information
UE User Equipment
WI Work Item Those skilled in the art will recognize improvements and modifications to the embodiments of the present disclosure. All such improvements and modifications are considered within the scope of the concepts disclosed herein.

REFERENCES

[1] 3GPP TR 36.777 V15.0.0, Study on Enhanced LTE support for Aerial Vehicles (Release 15)
[2] 3GPP TS 36.213, Section 5.1, "Uplink power control"
[3] 3GPP TS 36.213, Section 6.1, "Physical non-synchronized random access procedure"
[4] RP-172826, New WID on Enhanced LTE Support for Aerial Vehicles," Ericsson

What is claimed is:

1. A method performed by a wireless device for uplink power control, the method comprising:
   receiving, from a base station, reference altitude information comprising one or more height thresholds;
   receiving, from the base station, a configuration specifying two or more fractional pathloss compensation factors;
   determining a flying mode status from a height of the wireless device and the one or more height thresholds;
   detecting that the height of the wireless device is above a height threshold from among the one or more height thresholds;
   triggering and sending a measurement report to the base station upon detecting that the height of the wireless device is above the height threshold;
   receiving, from the base station, an indication to use a particular one of the two or more fractional pathloss compensation factors for uplink power control based on the measurement report, the two or more fractional pathloss compensation factors for uplink power control comprising one or more wireless device specific fractional pathloss compensation factors for uplink power control; and
   performing one or more uplink power control related tasks based on the flying mode status of the wireless device, wherein performing the one or more uplink power control related tasks comprises:
      performing uplink power control for an uplink transmission based on the particular one of the two or more fractional pathloss compensation factors indicated by the base station, wherein the uplink transmission is a Physical Uplink Shared Channel, PUSCH, transmission; and
      resetting an accumulation of a PUSCH power control adjustment state for a serving cell of the wireless device when the indication to use the particular one of the two or more fractional pathloss compensation factors for uplink power control is received.

2. The method of claim 1 wherein the two or more fractional pathloss compensation factors further comprise one or more cell specific fractional pathloss compensation factors for uplink power control.

3. The method of claim 1 wherein performing the one or more uplink power control related tasks based on the flying mode status of the wireless device comprises resetting the accumulation of the PUSCH power control adjustment state for the serving cell of the wireless device when the flying mode status of the wireless device changes.

4. A wireless device adapted to:
   receive, from a base station, reference altitude information comprising one or more height thresholds;
   receive, from the base station, a configuration specifying two or more fractional pathloss compensation factors;
   determine a flying mode status from a height of the wireless device and the one or more height thresholds;
   detect that the height of the wireless device is above a height threshold from among the one or more height thresholds;
   trigger and send a measurement report to the base station upon detecting that the height of the wireless device is above the height threshold;
   receive, from the base station, an indication to use a particular one of the two or more fractional pathloss compensation factors for uplink power control based on the measurement report, the two or more fractional pathloss compensation factors for uplink power control comprising one or more wireless device specific fractional pathloss compensation factors for uplink power control; and
   perform one or more uplink power control related tasks based on the flying mode status of the wireless device, wherein the wireless device is adapted to perform the one or more uplink power control related tasks by being adapted to:
      perform uplink power control for an uplink transmission based on the particular one of the two or more fractional pathloss compensation factors indicated by the base station, wherein the uplink transmission is a Physical Uplink Shared Channel, PUSCH, transmission; and
      reset an accumulation of a PUSCH power control adjustment state for a serving cell of the wireless device when the indication to use the particular one of the two or more fractional pathloss compensation factors for uplink power control is received.

5. A wireless device comprising:
   one or more transceivers; and
   processing circuitry associated with the one or more transceivers, the processing circuitry configured to cause the wireless device to:
      receive, from a base station, reference altitude information comprising one or more height thresholds;
      receive, from the base station, a configuration specifying two or more fractional pathloss compensation factors;
      determine a flying mode status from a height of the wireless device and the one or more height thresholds;
      detect that the height of the wireless device is above a height threshold from among the one or more height thresholds;
      trigger and send a measurement report to the base station upon detecting that the height of the wireless device is above the height threshold;

receive, from the base station, an indication to use a particular one of the two or more fractional pathloss compensation factors for uplink power control based on the measurement report, the two or more fractional pathloss compensation factors for uplink power control comprising one or more wireless device specific fractional pathloss compensation factors for uplink power control; and perform one or more uplink power control related tasks based on the flying mode status of the wireless device, wherein the processing circuitry is configured to cause the wireless device to perform the one or more uplink power control related tasks by being configured to cause the wireless device to:

perform uplink power control for an uplink transmission based on the particular one of the two or more fractional pathloss compensation factors indicated by the base station, wherein the uplink transmission is a Physical Uplink Shared Channel, PUSCH, transmission; and reset an accumulation of a PUSCH power control adjustment state for a serving cell of the wireless device when the indication to use the particular one of the two or more fractional pathloss compensation factors for uplink power control is received.

6. A method performed by a wireless device for uplink power control, the method comprising:

receiving, from a base station, reference altitude information comprising one or more height thresholds;

receiving, from the base station, a configuration specifying two or more fractional pathloss compensation factors;

determining a flying mode status from a height of the wireless device and the one or more height thresholds;

determining a particular one of the two or more fractional pathloss compensation factors to use for uplink power control based on the flying mode status of the wireless device, the two or more fractional pathloss compensation factors comprising a cell specific fractional pathloss compensation factor for uplink power control and a wireless device specific fractional pathloss compensation factor for uplink power control, wherein determining the particular one of the two or more fractional pathloss compensation factors to use for uplink power control based on the flying mode status of the wireless device comprises:

indicating, to the base station, the flying mode status of the wireless device; and receiving, from the base station, an indication to use the particular one of the two or more fractional pathloss compensation factors for uplink power control based on the flying mode status; and performing one or more uplink power control related tasks based on the flying mode status of the wireless device, wherein performing the one or more uplink power control related tasks comprises:

performing uplink power control for an uplink transmission based on the particular one of the two or more fractional pathloss compensation factors, wherein the uplink transmission is a Physical Uplink Shared Channel, PUSCH, transmission; and resetting an accumulation of a PUSCH power control adjustment state for a serving cell of the wireless device when the indication to use the particular one of the two or more fractional pathloss compensation factors for uplink power control is received.

7. The method of claim 6 further comprising:
receiving, from the base station, configurations of the two or more fractional pathloss compensation factors for uplink power control comprising the cell specific fractional pathloss compensation factor for uplink power control and the wireless device specific fractional pathloss compensation factor for uplink power control.

8. The method of claim 6 wherein the reference altitude information comprises two or more reference height thresholds.

9. The method of claim 6 wherein indicating, to the base station, the flying mode status of the wireless device comprises triggering and sending a measurement report to the base station when a height of the wireless device is above a reference height threshold.

10. The method of claim 6 wherein the indication is based on a Medium Access Control, MAC, Control Element, CE.

11. The method of claim 6 wherein the indication is based on Downlink Control Information, DCI.

12. The method of claim 6 wherein performing the one or more uplink power control related tasks based on the flying mode status of the wireless device comprises resetting the accumulation of the PUSCH power control adjustment state for the serving cell of the wireless device when the flying mode status of the wireless device changes.

13. A wireless device adapted to:
receive, from a base station, reference altitude information comprising one or more height thresholds;

receive, from the base station, a configuration specifying two or more fractional pathloss compensation factors;

determine a flying mode status from a height of the wireless device and the one or more height thresholds;

determine a particular one of the two or more fractional pathloss compensation factors to use for uplink power control based on the flying mode status of the wireless device, the two or more fractional pathloss compensation factors comprising a cell specific fractional pathloss compensation factor for uplink power control and a wireless device specific fractional pathloss compensation factor for uplink power control, wherein the wireless device is adapted to determine the particular one of the two or more fractional pathloss compensation factors to use for uplink power control based on the flying mode status of the wireless device by being adapted to:

indicate, to the base station, the flying mode status of the wireless device; and receive, from the base station, an indication to use the particular one of the two or more fractional pathloss compensation factors for uplink power control based on the flying mode status; and perform one or more uplink power control related tasks based on the flying mode status of the wireless device, wherein the wireless device is adapted to perform the one or more uplink power control related tasks by being adapted to:

perform uplink power control for an uplink transmission based on the particular one of the two or more fractional pathloss compensation factors, wherein the uplink transmission is a Physical Uplink Shared Channel, PUSCH, transmission; and reset an accumulation of a PUSCH power control adjustment state for a serving cell of the wireless device when the indication to use the particular one of the two or more fractional pathloss compensation factors for uplink power control is received.

14. A wireless device comprising:
one or more transceivers; and
processing circuitry associated with the one or more transceivers, the processing circuitry configured to cause the wireless device to:
  receive, from a base station, reference altitude information comprising one or more height thresholds;
  receive, from the base station, a configuration specifying two or more fractional pathloss compensation factors;
  determine a flying mode status from a height of the wireless device and the one or more height thresholds;
  determine a particular one of the two or more fractional pathloss compensation factors to use for uplink power control based on the flying mode status of the wireless device, the two or more fractional pathloss compensation factors comprising a cell specific fractional pathloss compensation factor for uplink power control and a wireless device specific fractional pathloss compensation factor for uplink power control, wherein the processing circuitry is configured to cause the wireless device to determine the particular one of the two or more fractional pathloss compensation factors to use for uplink power control based on the flying mode status of the wireless device by being configured to cause the wireless device to:
    indicate, to the base station, the flying mode status of the wireless device; and
    receive, from the base station, an indication to use the particular one of the two or more fractional pathloss compensation factors for uplink power control based on the flying mode status; and
  perform one or more uplink power control related tasks based on the flying mode status of the wireless device, wherein the processing circuitry is configured to cause the wireless device to perform the one or more uplink power control related tasks by being configured to cause the wireless device to:
    perform uplink power control for an uplink transmission based on the particular one of the two or more fractional pathloss compensation factors, wherein the uplink transmission is a Physical Uplink Shared Channel, PUSCH, transmission; and
    reset an accumulation of a PUSCH power control adjustment state for a serving cell of the wireless device when the indication to use the particular one of the two or more fractional pathloss compensation factors for uplink power control is received.

* * * * *